(12) United States Patent
Oguchi et al.

(10) Patent No.: US 10,987,942 B2
(45) Date of Patent: Apr. 27, 2021

(54) PRINTING APPARATUS

(71) Applicant: FUJITSU COMPONENT LIMITED, Tokyo (JP)

(72) Inventors: Tatsuya Oguchi, Tokyo (JP); Sumio Watanabe, Tokyo (JP); Yukihiro Mori, Tokyo (JP)

(73) Assignee: FUJITSU COMPONENT LIMITED, Tokyo (JP)

( * ) Notice: Subject to any disclaimer, the term of this patent is extended or adjusted under 35 U.S.C. 154(b) by 81 days.

(21) Appl. No.: 16/253,684

(22) Filed: Jan. 22, 2019

(65) Prior Publication Data

US 2019/0232681 A1 Aug. 1, 2019

(30) Foreign Application Priority Data

Feb. 1, 2018 (JP) .............................. JP2018-016710

(51) Int. Cl.
*B41J 3/36* (2006.01)
*H02J 7/00* (2006.01)
*H04N 1/00* (2006.01)
*B41J 29/02* (2006.01)

(52) U.S. Cl.
CPC .............. *B41J 3/36* (2013.01); *B41J 29/023* (2013.01); *H02J 7/00* (2013.01); *H02J 7/0029* (2013.01); *H02J 7/0077* (2013.01); *H02J 7/00712* (2020.01); *H04N 1/00206* (2013.01); *H02J 7/00306* (2020.01)

(58) Field of Classification Search
CPC .......... B41J 3/36; B41J 29/023; B41J 29/393; H02J 7/00712; H02J 7/00; H02J 7/0029; H02J 7/00306; H02J 7/0042; H04N 1/00206

USPC .......................................................... 320/137
See application file for complete search history.

(56) References Cited

U.S. PATENT DOCUMENTS

| | | | |
|---|---|---|---|
| 4,758,849 A | 7/1988 | Piatt et al. | |
| 5,294,792 A * | 3/1994 | Lewis | G06F 3/03546 250/221 |
| 5,501,535 A | 3/1996 | Hastings et al. | |
| 5,608,537 A * | 3/1997 | Manabe | H04N 1/00267 347/2 |
| 5,880,448 A | 3/1999 | Hetzer et al. | |
| 6,238,043 B1 | 5/2001 | Silverbrook | |
| 6,241,351 B1 | 6/2001 | Stephenson | |
| 6,416,160 B1 | 7/2002 | Silverbrook | |
| 6,553,459 B1 | 4/2003 | Silverbrook et al. | |

(Continued)

FOREIGN PATENT DOCUMENTS

| | | |
|---|---|---|
| JP | H07-222223 | 8/1995 |
| JP | 2003-500245 | 1/2003 |

(Continued)

*Primary Examiner* — M Baye Diao
(74) *Attorney, Agent, or Firm* — IPUSA, PLLC

(57) ABSTRACT

A printing apparatus includes a printer function part configured to print on a recording sheet, a power supply including a rechargeable battery, a charger configured to charge the rechargeable battery, and an input part configured to input information. The printer function part, the input part, the power supply, and the charger are arranged from a first end of the printing apparatus towards a second end opposite to the first end, in an order of the printer function part, the input part, the power supply, and the charger.

9 Claims, 22 Drawing Sheets

(56) References Cited

U.S. PATENT DOCUMENTS

| | | |
|---|---|---|
| 6,712,452 B1 | 3/2004 | Silverbrook et al. |
| 6,804,026 B1 | 10/2004 | Walmsley |
| 6,812,972 B1 | 11/2004 | Silverbrook et al. |
| 6,903,766 B1 | 6/2005 | Silverbrook et al. |
| 6,924,907 B1 | 8/2005 | Silverbrook et al. |
| 6,956,669 B1 | 10/2005 | Silverbrook et al. |
| 6,958,826 B1 | 10/2005 | Walmsley et al. |
| 6,967,741 B1 | 11/2005 | Silverbrook et al. |
| 6,975,429 B1 | 12/2005 | Walmsley et al. |
| 6,975,828 B2 * | 12/2005 | Bessho .............. G03G 15/0152 358/450 |
| 7,153,051 B2 * | 12/2006 | Takahashi ............ B41J 3/4075 400/691 |
| 7,259,889 B1 | 8/2007 | Walmsley |
| 7,449,861 B2 | 11/2008 | Horigome |
| 8,625,176 B2 * | 1/2014 | Miyake ............ H04N 1/00055 358/504 |
| 9,075,381 B2 * | 7/2015 | Hiraguchi .......... G03G 15/5004 |
| 2002/0051136 A1 * | 5/2002 | Kawamura ........ H04N 1/00424 358/1.1 |
| 2004/0150704 A1 | 8/2004 | Horigome |
| 2008/0198215 A1 | 8/2008 | Nopper et al. |
| 2009/0027698 A1 | 1/2009 | Velner et al. |
| 2011/0063649 A1 | 3/2011 | Komatsu |
| 2011/0200376 A1 | 8/2011 | Oozawa |
| 2017/0368853 A1 | 12/2017 | Satake |

FOREIGN PATENT DOCUMENTS

| | | | |
|---|---|---|---|
| JP | 2006-285605 | 10/2006 | |
| JP | 2009-165268 | 7/2009 | |
| JP | 4922196 | 4/2012 | |
| WO | WO-0072238 A1 * | 11/2000 | ........... G06F 3/1265 |
| WO | 2014/155882 | 10/2014 | |

* cited by examiner

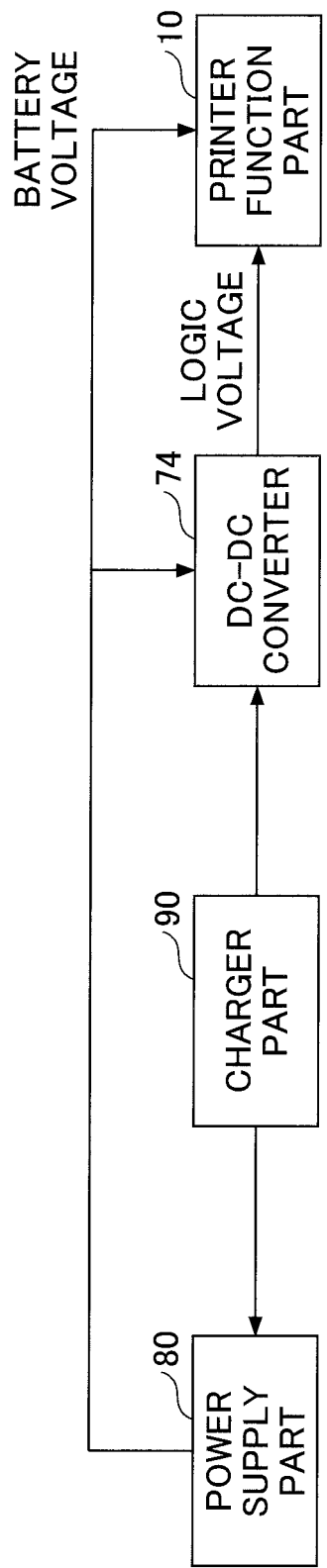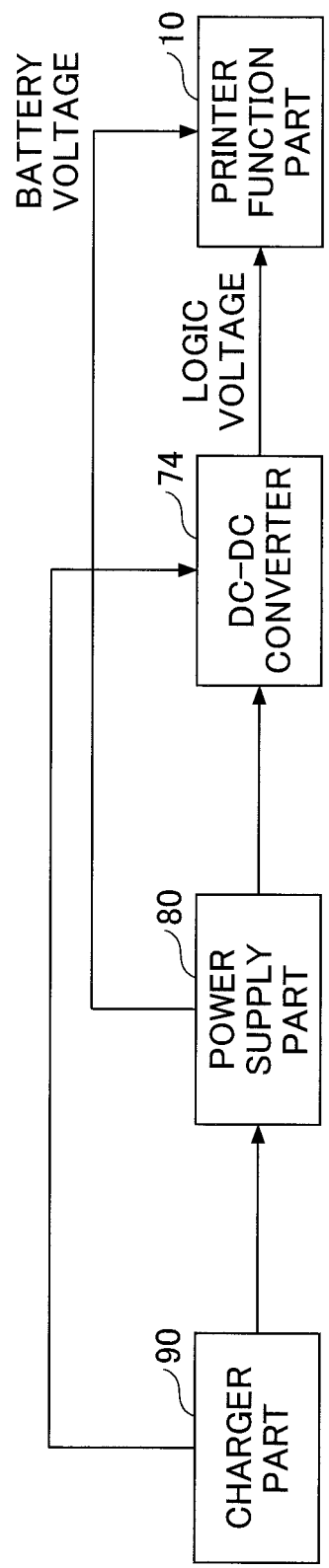

PRINTING APPARATUS

CROSS-REFERENCE TO RELATED APPLICATIONS

This application is based upon and claims priority to Japanese Patent Application No. 2018-016710 filed on Feb. 1, 2018, the entire contents of which are incorporated herein by reference.

BACKGROUND OF THE INVENTION

1. Field of the Invention

The embodiments discussed herein are related to a printing apparatus.

2. Description of the Related Art

Conventional portable printers have a box shape, and may be carried in a bag or the like. There are demands for compact printers due to convenience of portability, and printers having various configurations have been proposed.

Examples of portable printers are proposed in Japanese National Publication of International Patent Application No. 2003-500245 and Japanese Laid-Open Patent Publication No. 7-222223, for example.

The printer is provided with a connection terminal and a charging circuit for charging a rechargeable battery. The charging circuit is relatively large, and if the charging circuit is provided between the battery and a part that functions as the printer, a connector is required at a central portion of the printer to connect the battery. For this reason, a relatively large opening is provided to accommodate the connector. In addition, because the size of the connector is large compared to other components and a space is required for the connector, the size of the printer may become large.

SUMMARY OF THE INVENTION

Accordingly, it is an object in one aspect of the embodiments to provide a printing apparatus, which can be carried and charged with ease.

According to one aspect of embodiments of the present invention, a printing apparatus includes a printer function part configured to print on a recording sheet; a power supply including a rechargeable battery; a charger configured to charge the rechargeable battery; and an input part configured to input information, wherein the printer function part, the input part, the power supply, and the charger are arranged from a first end of the printing apparatus towards a second end opposite to the first end, in an order of the printer function part, the input part, the power supply, and the charger.

Other objects and further features of the present invention will be apparent from the following detailed description when read in conjunction with the accompanying drawings.

BRIEF DESCRIPTION OF THE DRAWINGS

FIG. 1A and FIG. 1B are diagrams for explaining a configuration of a portable printer;

DESCRIPTION OF THE EMBODIMENTS

Figure 2:
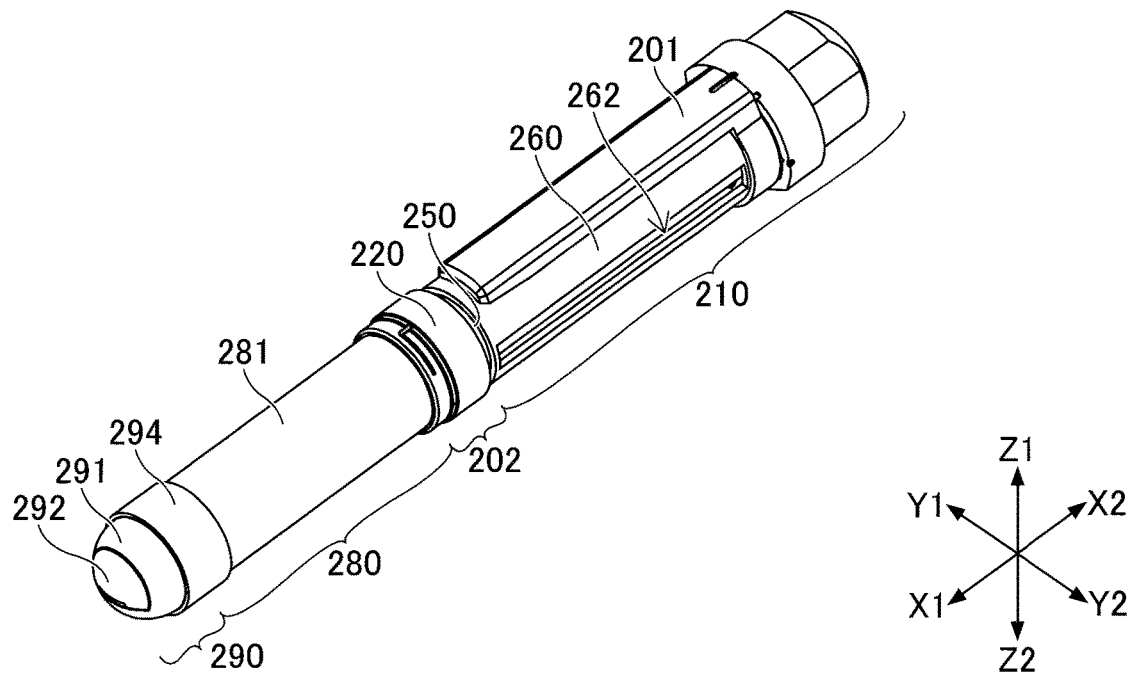
FIG. 2 is a perspective view of a printer in a first embodiment.

Embodiments of a printing apparatus according to the present invention will be described, by referring to the drawings. In the drawings, those parts or members that are the same are designated by the same reference numerals, and a description of the same parts or members will be omitted. In the following, an X1-X2 direction, a Y1-Y2 direction, and a Z1-Z2 direction denote mutually perpendicular directions.

A portable printer includes a printer function part (printing unit) 10 that functions as a printer, a power supply 80 having a rechargeable battery, a charger 90 having a charging circuit for charging the rechargeable battery, and a DC-DC converter 74 that converts a voltage of the rechargeable battery into a logic voltage. An arrangement of these parts of the portable printer will now be considered.

If the printer is to be formed into a pen shape, the power supply 80 may be provided at one end of the printer, and the power supply 80, the charger 90, the DC-DC converter 74, and the printing unit 10 may be arranged in this order toward the other end of the printer, as illustrated in FIG. 1A. Elements of the printing unit 10 operated by a battery voltage are supplied with the battery voltage from the power supply 80, and the elements that drive and control a control unit operated by the logic voltage are supplied with the logic voltage from the DC-DC converter 74. Conventionally, when charging of the battery starts, a charging current may be consumed by other circuits to decrease the charging current. For the purposes of avoiding a fault such as an incomplete charging, the supply of the logic voltage in the printing unit 10 is stopped in a conventional method.

In FIG. 1A, the charger 90 is arranged at a central portion of the printer. However, the charger 90 is relatively large, and if dials for control such as selecting functions of the printer are to be arranged at the central portion, the dials and the charger 90 may interfere with each other. As a result, the central portion of the printer becomes large to make the entire size of the printer large, or a bulge is formed at the central portion, to deteriorate the convenience of portability. Further, in order to change the voltage of battery, it becomes necessary to newly design a connecting part for connecting the new type of battery to the printing unit 10.

The charger 90 may include a USB (Universal Serial Bus) connector for charging the battery. However, the USB connector is large compared to other components. In order to compensate for the decrease in the strength caused by an opening for the USB connector, a padding or an increase in size is required to secure a sufficient strength. Moreover, if a knock switch is mounted at the central portion, it also requires a relatively large space. A relatively large space may be also required to completely separate a charger connector from other components.

On the other hand, according to the printer in this embodiment, the charger 90 is provided at one end of the printer, and the charger 90, the power supply 80, the DC-DC converter 74, and the printing unit 10 are arranged in this order toward the other end of the printer, as illustrated in FIG. 1B. In this case, a knock dial can be provided at the central portion of the printer between the power supply 80 and the printing unit 10. For this reason, no bulge is formed at the central portion, and the entire size of the printer will not become large. In addition, the knock dial requires no modification even when the battery voltage varies. Further, by providing the charger 90 at the end of the printer, the charger 90 can easily be changed according to the battery voltage change, and only the power supply 80 and the charger 90 need to cope with the battery capacity and size. By providing the charger 90 at the end of the printer, the design modifications become easier, and the load on making the new design can be reduced.

[Printing Apparatus]

The printing apparatus in this embodiment receives information from an information communication apparatus, and prints the received information on a recording sheet such as paper.

Figure 3:
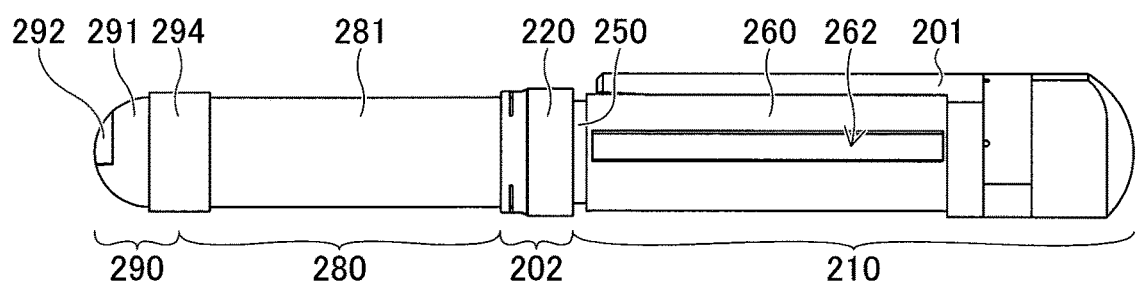
FIG. 3 is a front view of the printer in the first embodiment.
Figure 4:
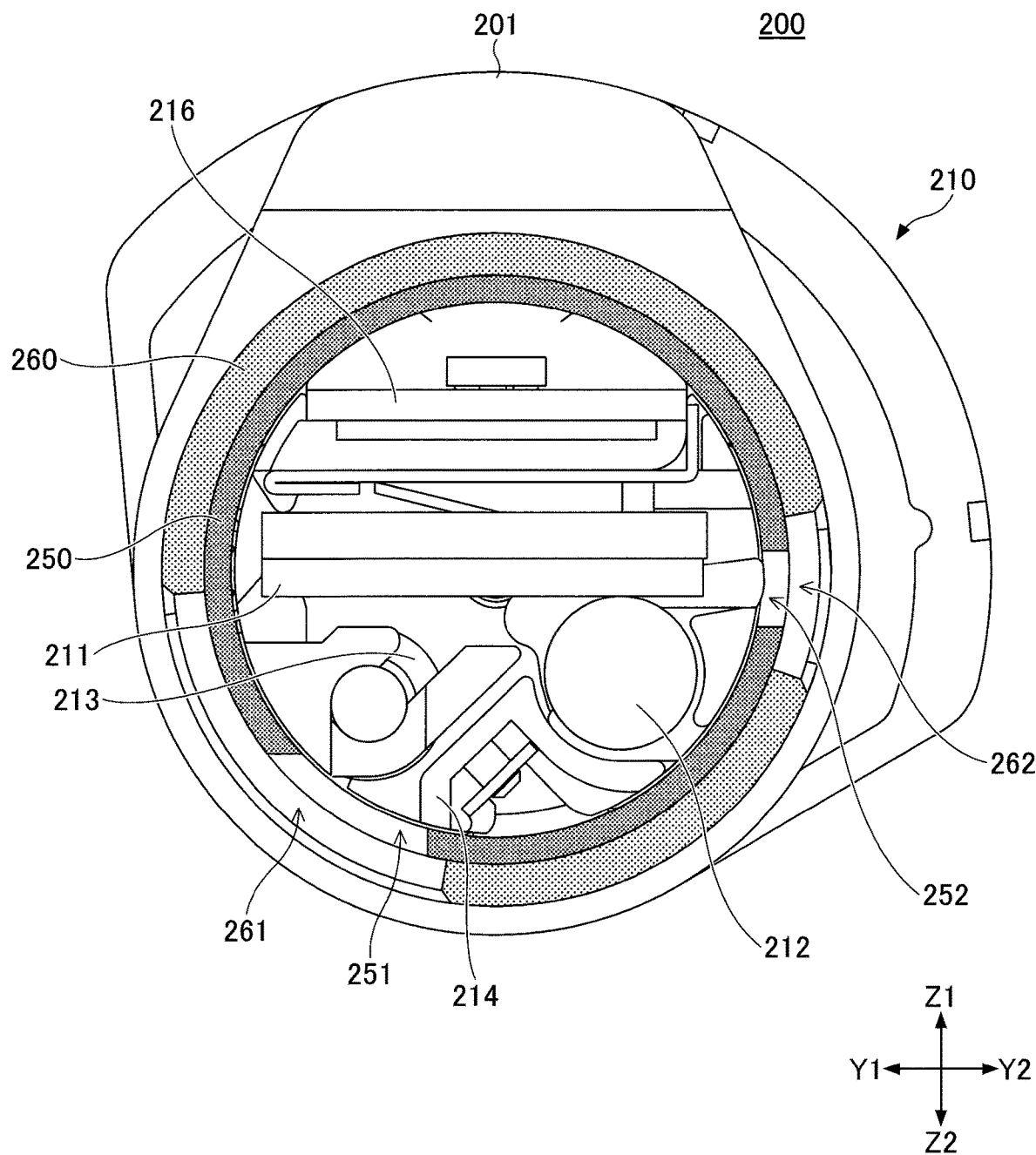
FIG. 4 is a cross sectional view of the printer in the first embodiment.

A printer 200, that is an example of the printing apparatus in this embodiment, will be described by referring to FIG. 2 through FIG. 4. FIG. 2 is a perspective view of the printer 200, FIG. 3 is a front view of the printer 200, and FIG. 4 is a cross sectional view in part of the printer 200. The printer 200 has an external appearance formed to a columnar shape, and is an IoT (Internet of Things) device having a printer function and a wireless communication function.

The printer 200 includes a printing unit 210, a knock dial 202, a power supply 280, and a charger 290. The charger 290, the power supply 280, the knock dial 202, and the printing unit 210 are arranged in this order from the X1-side towards the X2-side. The power supply 280 is provided between the printing unit 210 and the charger 290.

As illustrated in FIG. 4, the printing unit 210 includes a printing head 211 such as a thermal head, a platen roller 212, a feed roller 213, a sheet guide 214, a spring (not illustrated) for pushing the printing head against the platen roller, a control board 216, an inner lid 250, and an outer lid 260. The recording sheet enters the printer 200 from the side provided with the feed roller 213, along the sheet guide 214, and is transported in a state that is sandwiched between the printing head 211 and the platen roller 212. The information is printed on the recording sheet while the recording sheet is transported, and the recording sheet is ejected from the printer 200. Electronic circuits and electronic components that control the printer 200 are mounted on the control board 216.

The inner lid 250 and the outer lid 260 are formed to a cylindrical shape, so that the inner lid 250 enters an inner side of the outer lid 260. A feed opening 251 and an ejection opening 252 that are provided in the inner lid 250 open along a generatrix of the inner lid 250. A feed opening 261 and an ejection opening 262 that are provided in the outer lid 260 open along a generatrix of the outer lid 260. The outer lid 260 is rotatable with respect to the inner lid 250. When the printer 200 prints, the opening 251 matches the position of the opening 261, and the opening 252 matches the position of the opening 262. The recording sheet enters the printer 200 through the opening 251 and the opening 261 that are open, and the recording sheet is ejected from the printer 200 through the opening 252 and the opening 262 that are open.

A cassette (not illustrated) accommodating recording sheets can be connected to the opening 261.

Print data are sent from the information communication apparatus to the printer 200 by wireless communication such as BLE (Bluetooth™ Low Energy). The printer 200 receives the print data, and prints the received print data on the recording sheet.

The power supply 280 includes an ion battery inside a casing as the rechargeable battery. The printer 200 can be driven by power supplied from the rechargeable battery. A hook 201 is provided on the X2-side of the printer 200. The knock dial 202 is provided between the printing unit 210 and the power supply 280. The knock dial 202 switches the power supply to the printing unit 210.

The printer 200 has a compact size having a diameter of approximately 18 mm and a length of approximately 165 mm to 170 mm. The printer 200 can be carried by a user without causing stress to the user. The printer 200 can be carried in a manner similar to a pen, by placing the printer 200 into a breast pocket or the like clipping the printer 200 to the breast pocket using the hook 201.

[Control Functions]

Control functions of the printer 200 will be described. As illustrated in FIG. 2, the knock dial 202 is provided on the printer 200. The knock dial 202 functions as an input part.

Figure 5:
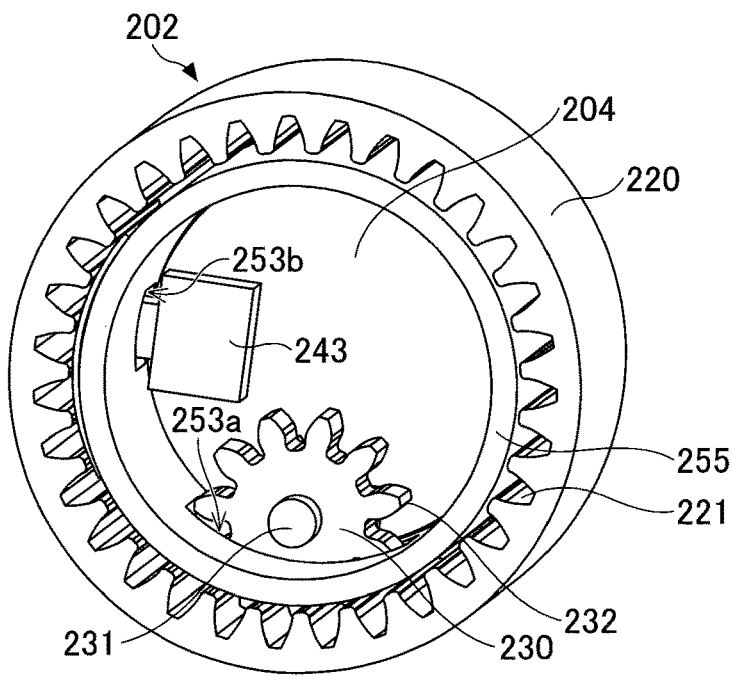
FIG. 5 is a perspective view of a knock dial of the printer in the first embodiment.
Figure 6:
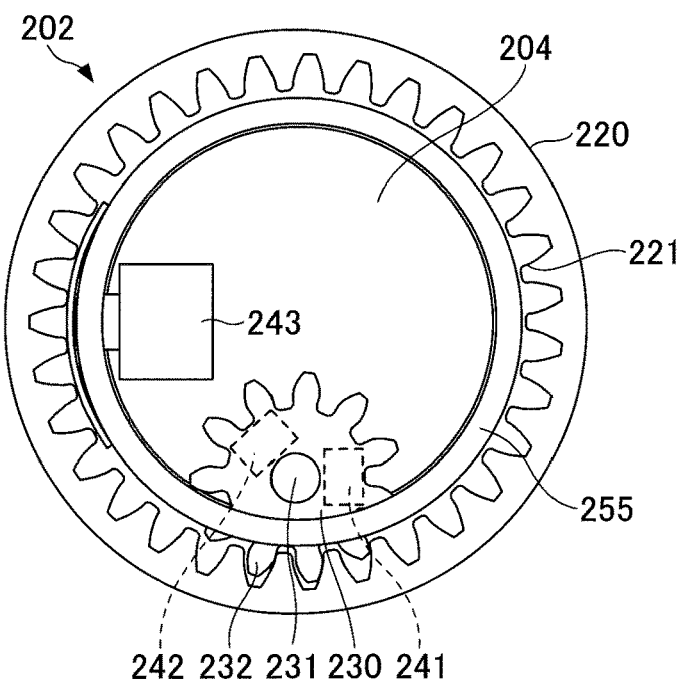
FIG. 6 is a diagram for explaining a structure of the knock dial of the first embodiment.
Figure 7:
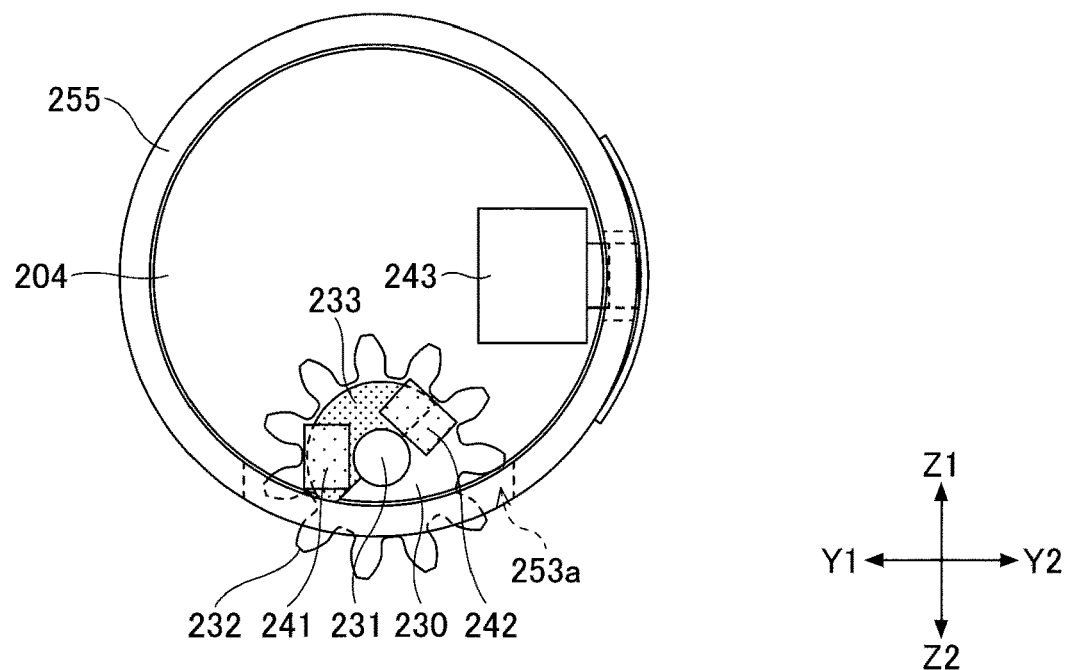
FIG. 7 is a diagram for explaining the structure of the knock dial of the first embodiment.
Figure 8:
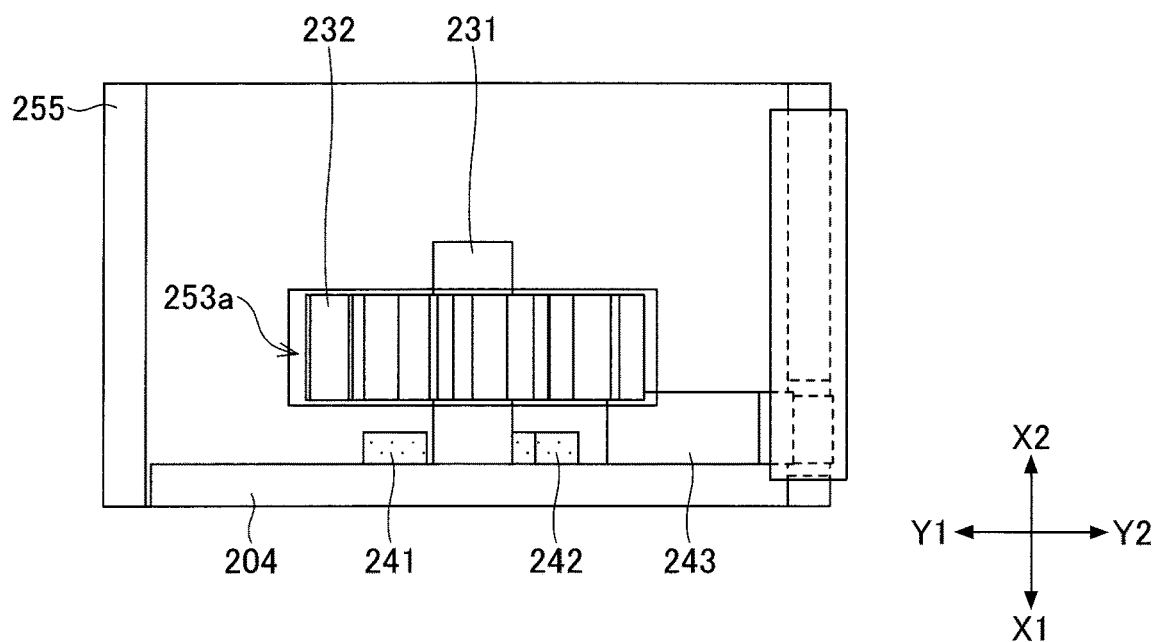
FIG. 8 is a diagram for explaining the structure of the knock dial of the first embodiment.

FIG. 5 is a perspective view of an inner side of the knock dial 202. FIG. 6 illustrates a transmission image of the knock dial 202 viewed from the X2-side, FIG. 7 illustrates a transmission image of the knock dial 202 viewed from the X1-side, and FIG. 8 illustrates a transmission image of the knock dial 202 viewed from the Z1-side.

As illustrated in FIG. 5 through FIG. 8, the knock dial 202 includes a dial knob 220, an encoder wheel 230, a first photosensor 241, a second photosensor 242, and a knock switch 243.

[Knock Dial]

The dial knob 220 is formed to a cylindrical shape, and a gear 221 is provided on the inner side of the dial knob 220. The dial knob 220 is arranged on an outer side of a dial base 255. The encoder wheel 230 is mounted on a substrate 204 on the inner side of the dial knob 220, in a state in which the encoder wheel 230 is rotatable around a shaft 231 as a rotation center thereof. A gear 232 is provided in a periphery of the encoder wheel 230. An opening 253a is provided in a region of the dial base 255 where the encoder wheel 230 is provided, and the gear 221 and the gear 232 mesh at the opening 253a.

When the dial knob 220 is pushed from the Y2 side, the knock switch 243 is pushed.

In this embodiment, the encoder wheel 230 having the gear 232 that meshes the gear 221 rotates around the shaft 231 by rotating the dial knob 220.

Figure 9:
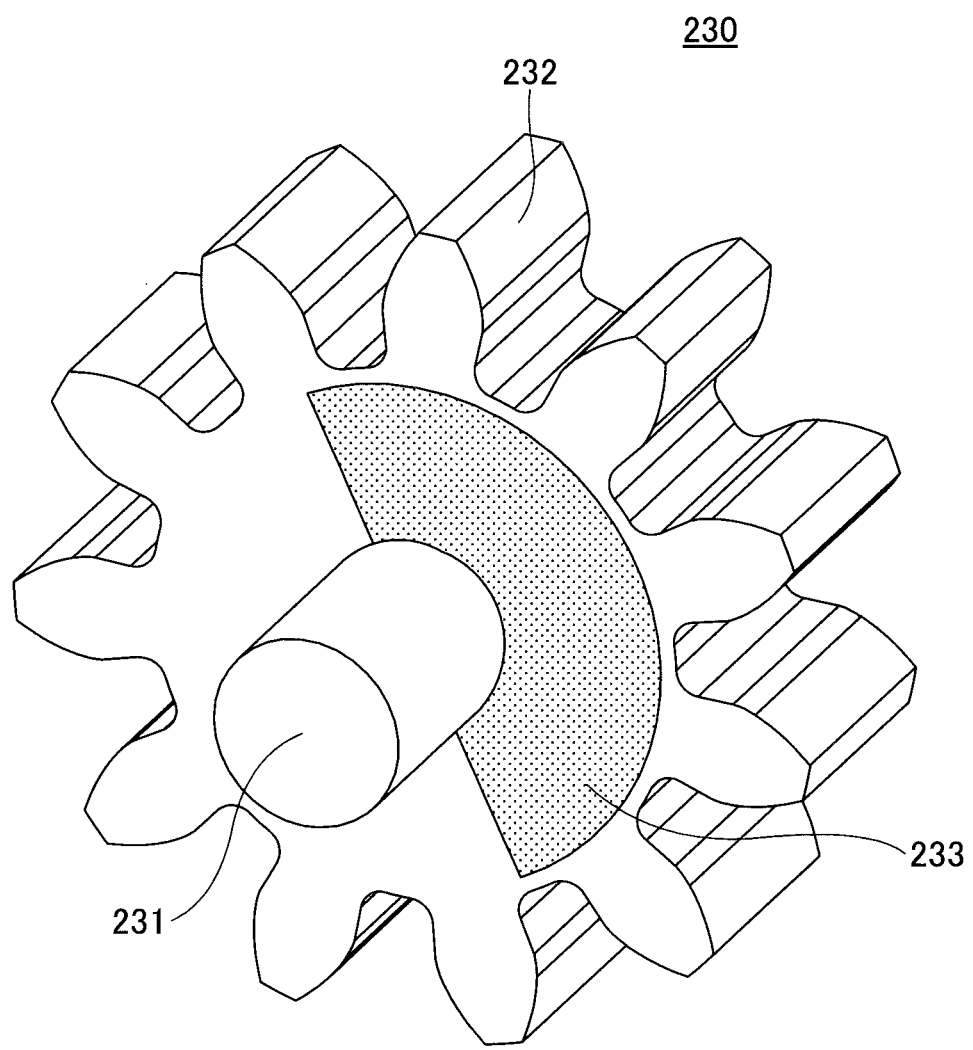
FIG. 9 is a diagram for explaining an encoder wheel of the first embodiment.

FIG. 9 is a diagram illustrating the encoder wheel 230. The encoder wheel 230 is formed by a white material so as to reflect light, and partially includes a black non-reflecting part 233 that does not reflect the light. As illustrated in FIG. 9, the non-reflecting part 233 is provided on a surface of the encoder wheel 230 on a side where the first photosensor 241 and the second photosensor 242 are provided. The non-reflecting part 233 has a semicircular shape having the shaft 231 as a center thereof, and a part on the surface of the encoder wheel 230 where the non-reflecting part 233 is not formed functions as a reflecting part that reflects the light. The non-reflecting part 233 and the reflecting part need only have mutually different reflectivities, and the non-reflecting part 233 does not need to be black as long as the reflectivity of the non-reflecting part 233 is lower than the reflectivity of the reflecting part, for example.

The first photosensor 241 and the second photosensor 241 are both reflection-type optical sensors including a light emitter and a light receiver. The first photosensor 241 and the second photosensor 242 are arranged so as to detect reflected light at different positions on the encoder wheel 230. The first photosensor 241 and the second photosensor 242 are mounted on the substrate 204, so that an angle between the first photosensor 241 and the second photosensor 242 with respect to the shaft 231 becomes 135°, for example.

According to the printer 200, information can be input by rotating and pushing the dial knob 220.

When the dial knob 220 is rotated clockwise when viewed from the X1-side as illustrated in FIG. 7, the encoder wheel 230 rotates clockwise. When the dial knob 220 is rotated counterclockwise when viewed from the X1-side, the encoder wheel 230 rotates counterclockwise. In this embodiment, the rotation and the rotating direction of the dial knob 220 can be detected by detecting the rotation and the rotating direction of the encoder wheel 230 by the first photosensor 241 and the second photosensor 242.

The dial knob 220 and the encoder wheel 230 are formed with the gears in the illustrated example, however, the gears may be replaced by O-rings, for example.

[Power Supply and Charger]

Figure 10:
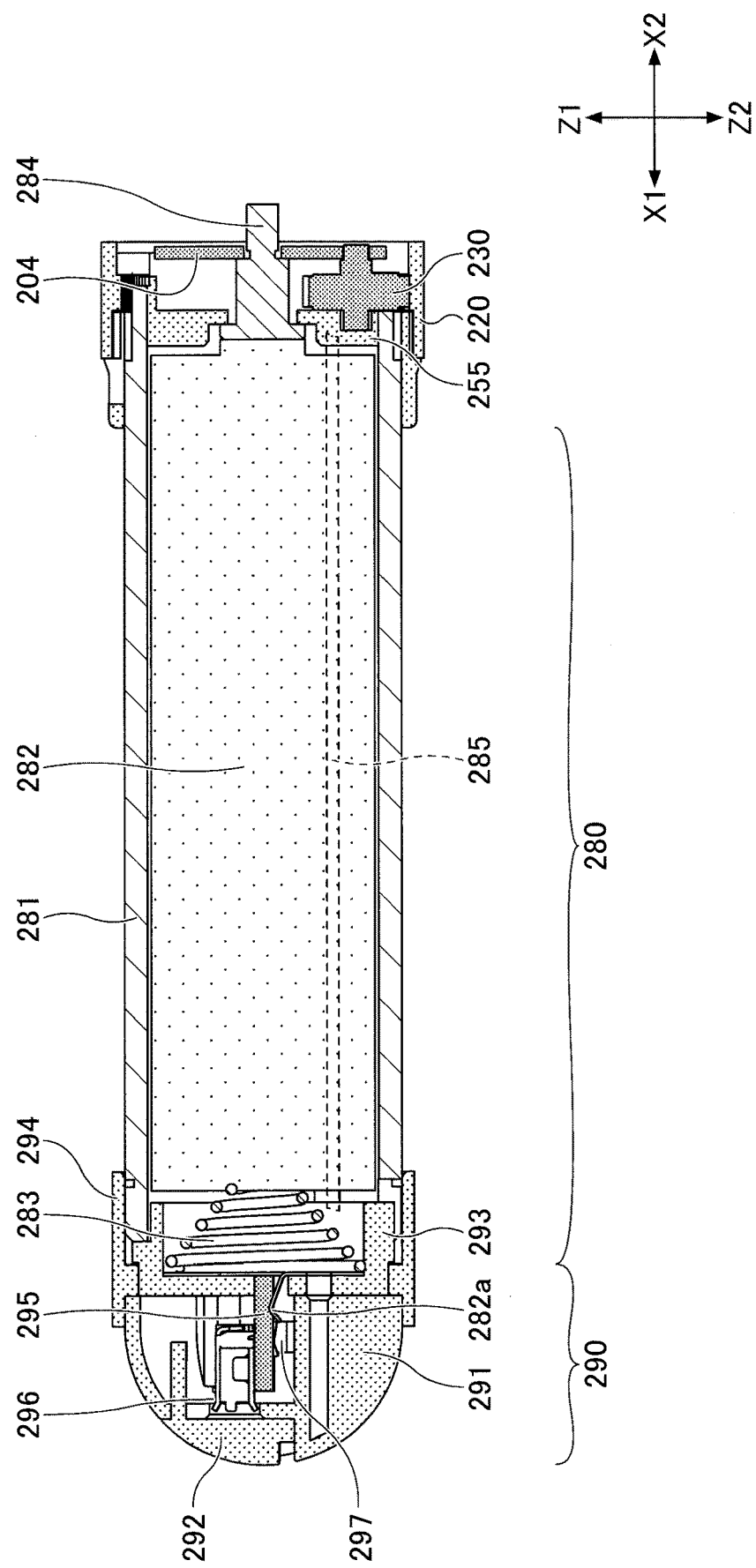
FIG. 10 is a diagram illustrating a power supply and a charger of the first embodiment.
Figure 11:
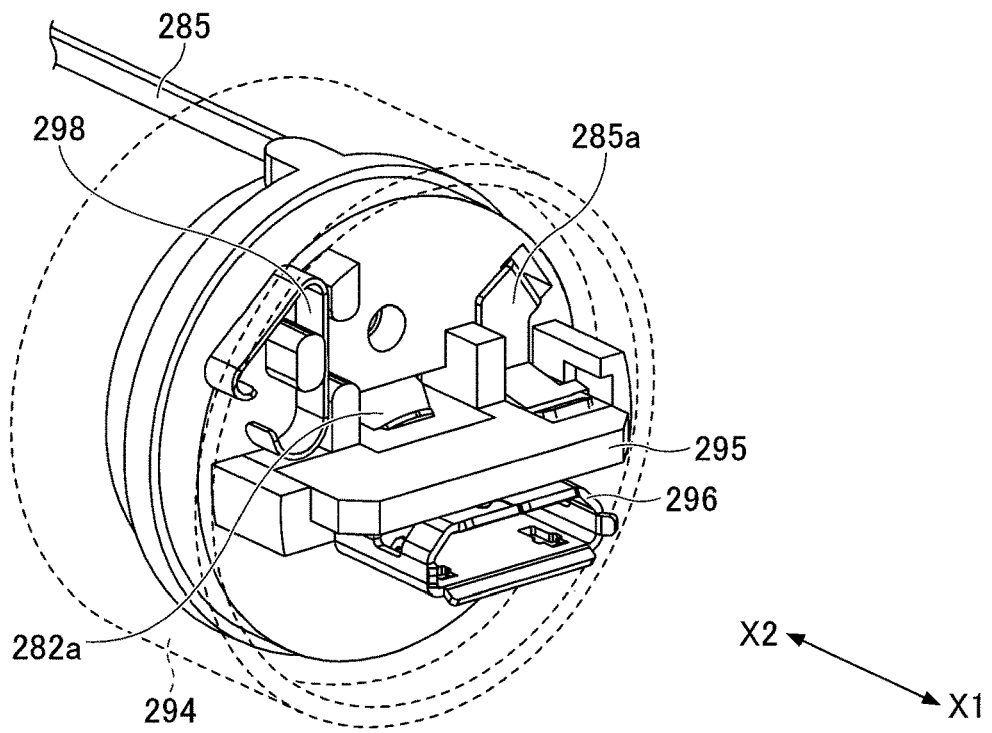
FIG. 11 is a diagram for explaining the charger of the first embodiment.
Figure 12:
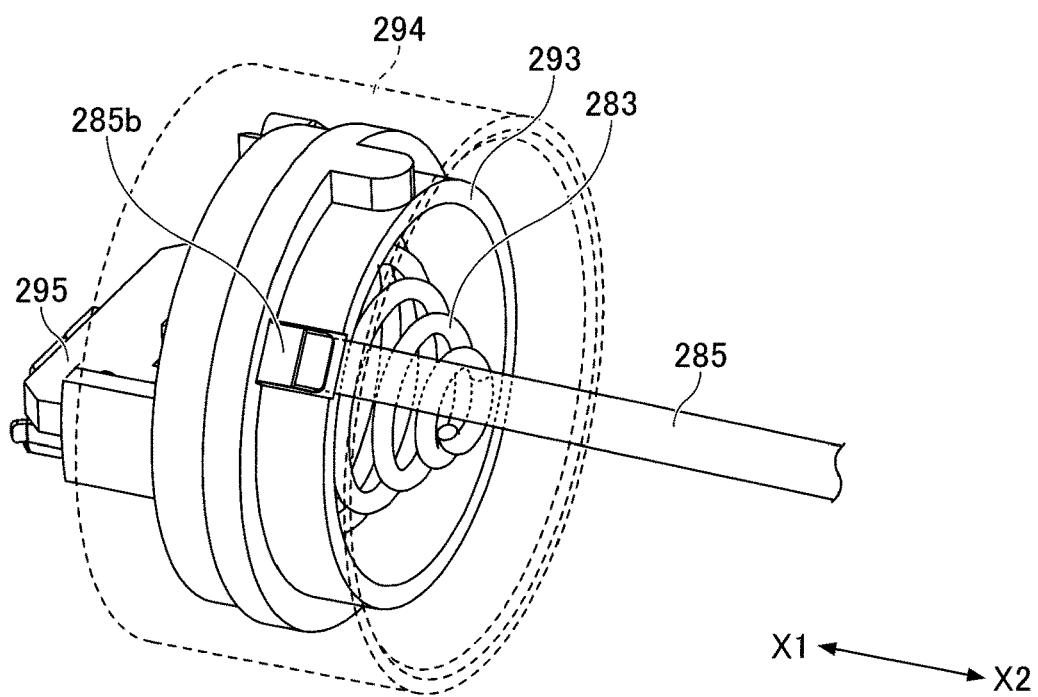
FIG. 12 is a diagram for explaining the charger of first embodiment.
Figure 13:
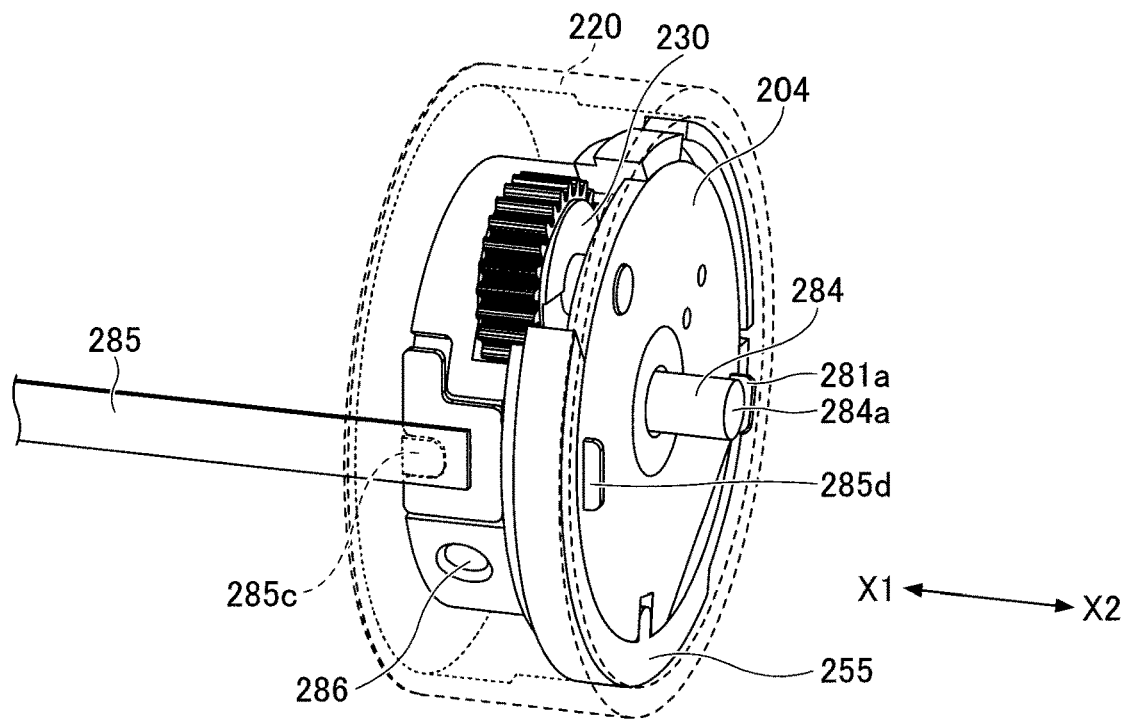
FIG. 13 is a diagram for explaining the power supply of first embodiment.
Figure 14:
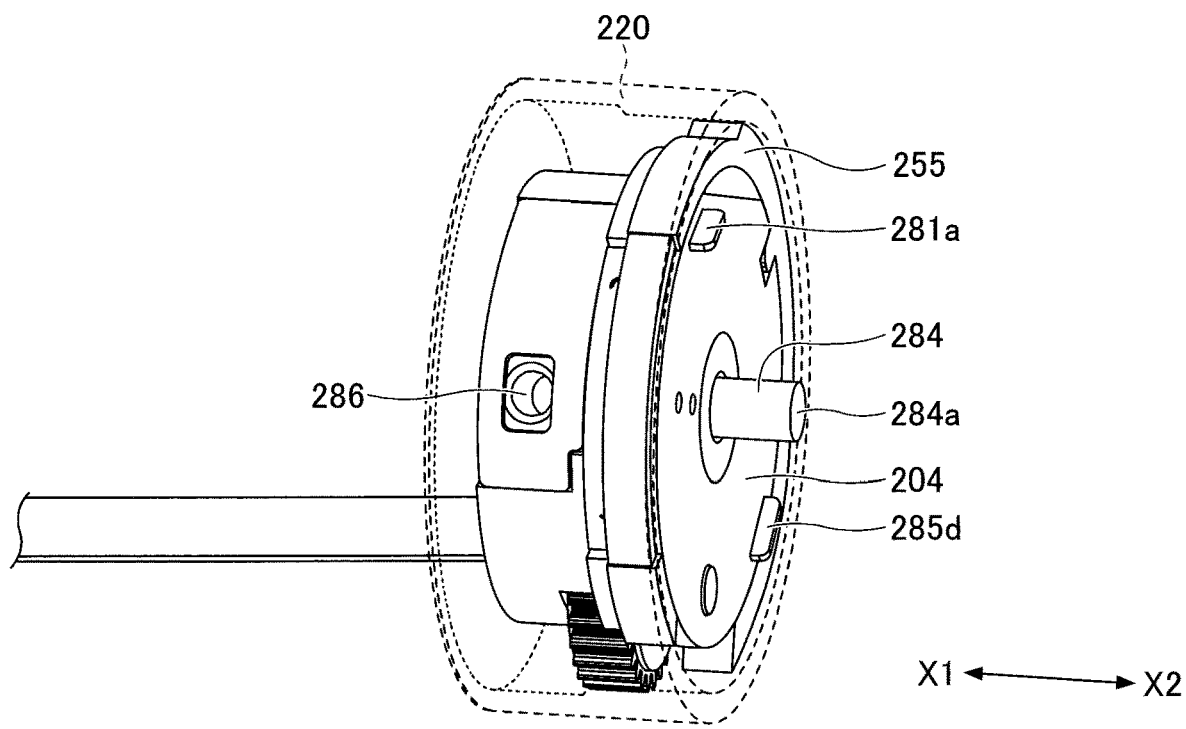
FIG. 14 is a diagram for explaining the power supply of the first embodiment.

The power supply 280 and the charger 290 will be described by referring to FIG. 10 through FIG. 14. FIG. 10 is a diagram illustrating the power supply 280 and the charger 290. FIG. 11 and FIG. 12 are perspective views of a cathode side of the power supply 280 and the charger 290, and FIG. 13 and FIG. 14 are perspective views of the cathode side of the power supply 280.

The power supply 280 includes a casing 281, and a battery 282 provided inside the casing 281. A coil spring 283 for cathode connection is provided at the X1-end of the casing 281, and an anode terminal 284 is provided at the X2-end of the casing 281. A cathode of the battery 282 contacts the spring 283, and an anode of the battery 282 contacts the anode terminal 284. The substrate 204 on which the dial knob 220 and the encoder wheel 230 are mounted is provided on the anode side of the battery 282. In addition, a charging internal wiring 285 that extends from the X1-side to the X2-side is provided inside the casing 281.

The charger 290 includes a cap 291 that covers an outer side thereof, and a cap 292 that covers the USB connector 296. A base 293 and the cap 291 are fitted inside and fixed by a mounting bracket 294. The spring 283 is fixed to the base 293 on the side of the battery 282.

A substrate 295 of a charging circuit 297 that extends to the outer side of the base 293 is provided on the base 293. The USB connector 296 is provided on a first surface of the substrate 295. The charging circuit 297, formed by an IC (Integrated Circuit) or the like, is provided on a second surface of the substrate 295 opposite to the first surface. The cap 292 is provided in front of an insertion hole of the USB connector 296. The insertion hole is exposed by removing the cap 292, so that a USB connection terminal for charging may be connected to the USB connector 296.

A connection spring 282a is provided to connect the spring 283 and a cathode wiring provided on the substrate 295. The spring 282a is connected to a land pattern provided on the substrate 295. In addition, an electrode spring 285a connected to a wiring of the substrate 295 and a connection part 285b for connecting the electrode spring 285a and the wiring 285 are provided for the internal wiring.

A screw hole 286 for fixing the casing 281 on the dial base 255 using a screw is provided on the anode side of the power supply 280. In addition, an end part 284a of the anode terminal 284, an end part 281a of the casing 281, and an end part 285d, are provided more on the X2-side than the substrate 204, and are connected to a wiring (not illustrated) of the printing unit 210. The wiring 285 is connected to the end part 285d by a connection spring 285c. A spring 298 connected to the mounting bracket 294 and to the cathode of the battery 282 via the connection spring 282a is provided. By screwing the mounting bracket 294 into the casing 281, the spring 298 is electrically connected to the substrate 204 via the end part 281a.

[Functional Blocks]

Figure 15:
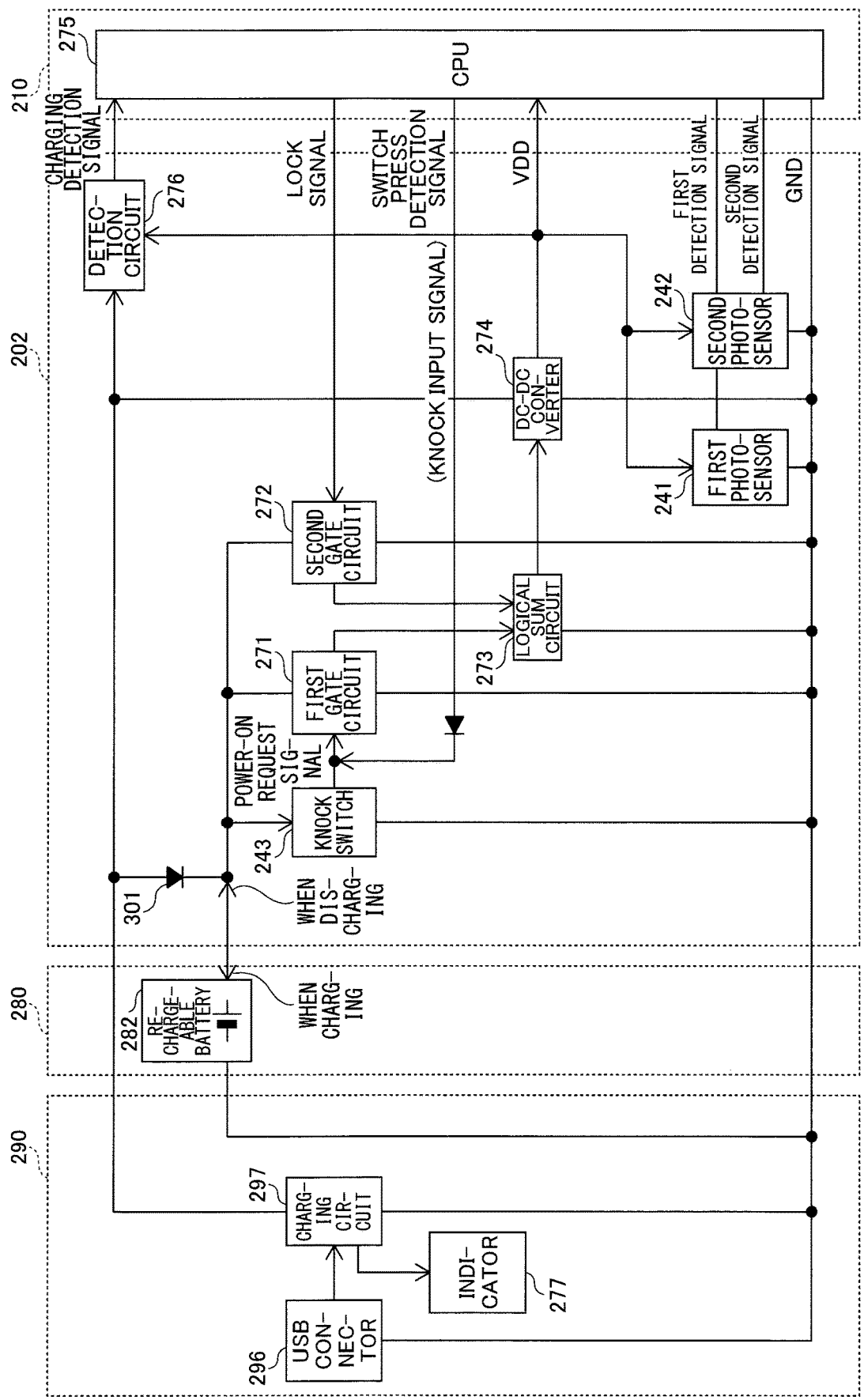
FIG. 15 is a block diagram illustrating an electrical circuit of the printer in the first embodiment.

Functional blocks of the printer 200 will be described, by referring to FIG. 15. FIG. 15 is a block diagram illustrating an electrical circuit of the printer 200. The USB connector 296, the charging circuit 297, and an indicator 277 are provided in the charger 290. In addition, a driver (not illustrated) that drives the entire printer 200, and a CPU (Central Processing Unit) 275 that is an example of a controller, are provided in the printing unit 210. The first photosensor 241, the second photosensor 242, the knock switch 243, a first gate circuit 271, a second gate circuit 272, a logical sum circuit (OR circuit) 273, a DC-DC converter 274, a detector 276, and a diode 301 are provided in the knock dial 202.

The printer 200 can perform wireless communication with the information communication apparatus (not illustrated). The wireless communication between the communication apparatus and the printer 200 employs the BLE, for example.

Functions and signals related to the functional blocks will be described, by referring to FIG. 15.

When an external battery charger is connected to the USB connector 296, a charging voltage that is a high voltage is supplied to the charging circuit 297. The charging circuit 297 turns on the indicator 277 to indicate that the battery 282 is being charged when the charging circuit 297 enters a charging mode. The charging circuit 297 outputs a voltage that is subjected to a constant current control in order to charge the battery 282. The charging of the battery starts through the diode 301 as the charging voltage is higher with respect to the voltage of the battery 282. If the battery 282 is in an over-discharge state, the charging voltage from the charging circuit 297 is pulled down to a low voltage, and the charging circuit 297 stops the charging for the protection.

The voltage is applied to the knock switch 243, the first gate circuit 271, and the second gate circuit 272 from the charging circuit 297 through the diode 301, or from the battery 282. When the knock switch 243 is pressed in this state, a power-on request signal is output to the first gate circuit 271. In response to the power-on request signal, the first gate circuit 271 outputs a high-level signal to the OR circuit 273. The OR circuit 273 outputs the high-level signal to the DC-DC converter 274. The DC-DC converter 274 outputs the logic voltage VDD, and the CPU 275 is activated to output a lock signal to the second gate circuit 272. This state continues even if the knock switch 243 is removed, because the activated CPU 275 continues to output the lock signal. The CPU 275 confirms a charging detection signal from the detector 276. When the CPU 275 confirms that the battery 282 is being charged based on the charging detection signal, the CPU 275 controls the state to a halt state after a current process ends, in order to prevent the charging current from being used by other processes and the battery charging becoming incomplete.

When the knock switch 243 is pressed after the CPU 275 is activated, a switch press detection signal assumes a low level. The CPU 275 can detect input operations such as a mode selection based on the switch press detection signal. The first photosensor 241 and the second photosensor 242 generate rotation detection signals of the knock dial 202. The CPU 275 detects a sequence of the rotation detection signals to judge whether the knock dial 202 rotates clockwise or counterclockwise.

The USB connector 296 is used to connect the external battery charger, and supplies the power to the charging circuit 297. The charging circuit 297 receives an input voltage from the USB connector 296, and supplies the charging voltage to the battery 282. The charging voltage is also supplied to the diode 301 and the detector 276.

The indicator 277 indicates that the battery 282 is being charged. A signal to the indicator 277 is supplied from the charging circuit 297.

At the time of charging, the charging current flows to the battery 282 through the diode 301. On the other hand, the battery 282 is directly connected to the components requiring the power, such as a gate circuit, a head, and a motor, at the time of a normal driving of the printer.

The diode 301 flows the current only in the charging direction, and cuts off the current discharge from the battery in a standby mode.

The knock switch 243 is inserted between a power supply and ground GND. When the knock switch 243 is pressed, the knock switch 243 is connected to the CPU 275 via the gate circuit. The knock switch 243 is a source with respect to the first gate circuit 271, and is a sink with respect to the CPU 275. A diode (not illustrated) provided between the CPU 275 and the knock switch 243 prevents a latch-up or an erroneous operation when the logic voltage VDD of the CPU 275 is disconnected.

The first gate circuit 271 receives the power supplied from the battery 282, and outputs the high-level signal to the OR circuit 273 in response to the power-on request signal from the knock switch 243.

After the CPU 275 is activated, the second gate circuit 272 outputs a high-level lock signal to the OR circuit 273, that is the lock signal from the CPU 275 to the second gate circuit 272, to lock the DC-DC converter 274 in an activated state.

The OR circuit 273 outputs a signal of a logical sum of the outputs of the first gate circuit 271 and the second gate circuit 272 to the DC-DC converter 274.

The DC-DC converter 274 outputs the logic voltage VDD to the CPU 275, in response to the signal received from the OR circuit 273.

The detector 276 detects the charging state from the output of the charging circuit 297, and notifies the charging state to the CPU 275.

The first photosensor 241 and the second photosensor 242 respectively output a first detection signal and a second detection signal as a phase difference signal, when the dial knob 220 is rotated. The CPU 275 judges whether the detected rotation of the dial knob 220 is the clockwise rotation or the counterclockwise rotation, in response to the first detection signal and the second detection signal.

When the knock switch 243 is turned on, a lower terminal of the knock switch 243 is grounded. As a result, the CPU 275 outputs the switch press detection signal to the knock switch 243, a gate of the first gate circuit 271 is grounded and the first gate circuit 271 turns on.

When the high-level lock signal is output from the CPU 275 and input to a gate of the second gate circuit 272, the second gate circuit 272 is turned on. Hence, the OR circuit 273 outputs the high-level signal to the DC-DC converter 274, and the DC-DC converter 274 outputs the logic voltage VDD. The logic voltage VDD is supplied to the CPU 275 and the detector 276. When the logic voltage VDD and the charging voltage are supplied to the detector 276, the detector 276 is turned on to output a charging detection signal. The charging detection signal is supplied to the CPU 275.

[Turning On Power Supply]

Figure 16:
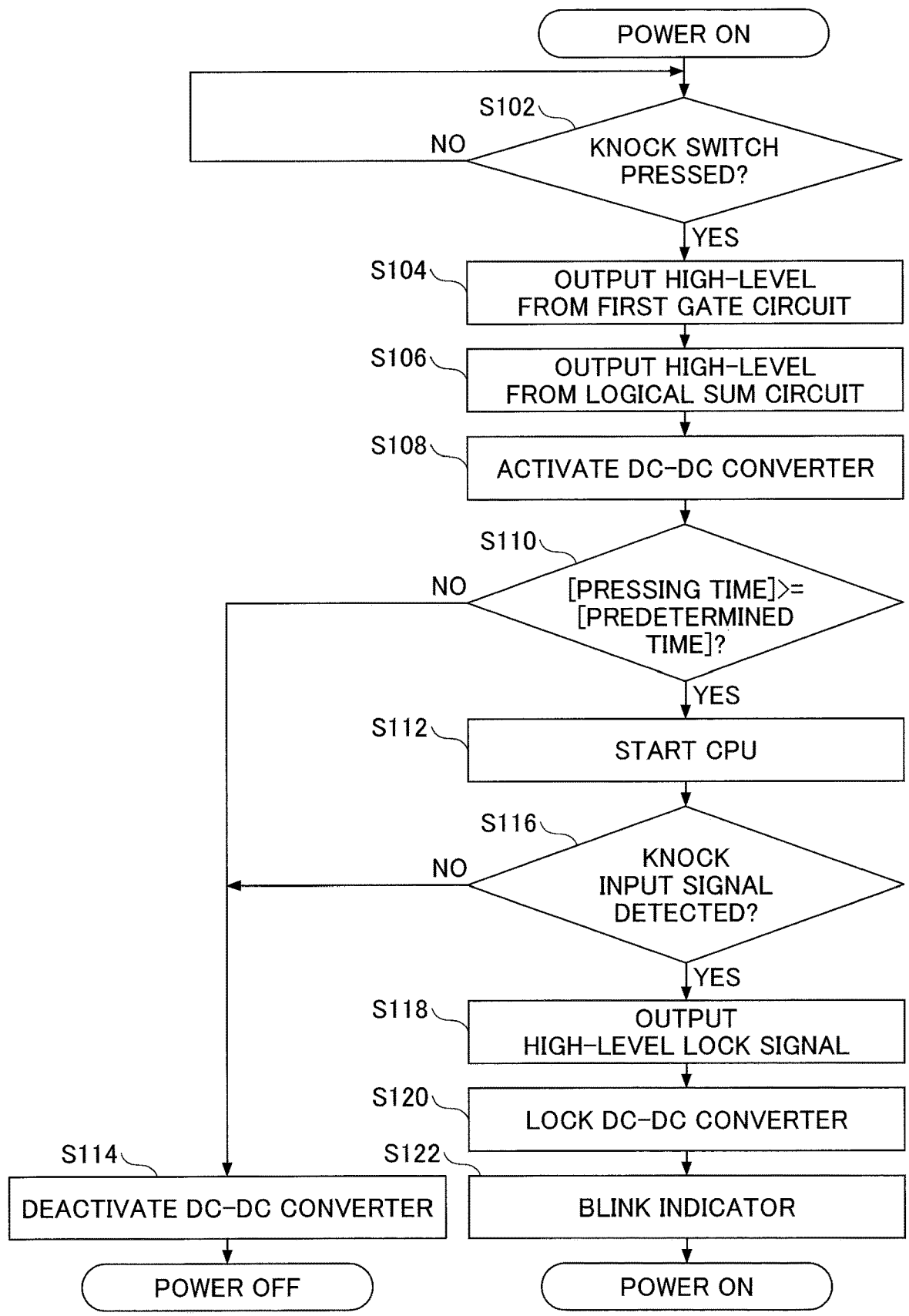
FIG. 16 is a flow chart for explaining an operation to turn on power of the printer.

A case in which the power of the printer 200 is turned on in order to drive the printer 200 by the battery 282 will be described by referring to FIG. 16. In order to turn on the power of the printer 200, a portion of the dial knob 220 where the knock switch 243 is provided is pressed from outside for a predetermined time. A long press of the knock switch 243, in which the knock switch 243 is pressed and held for the predetermined time, is performed by this pressing operation.

Figure 17:
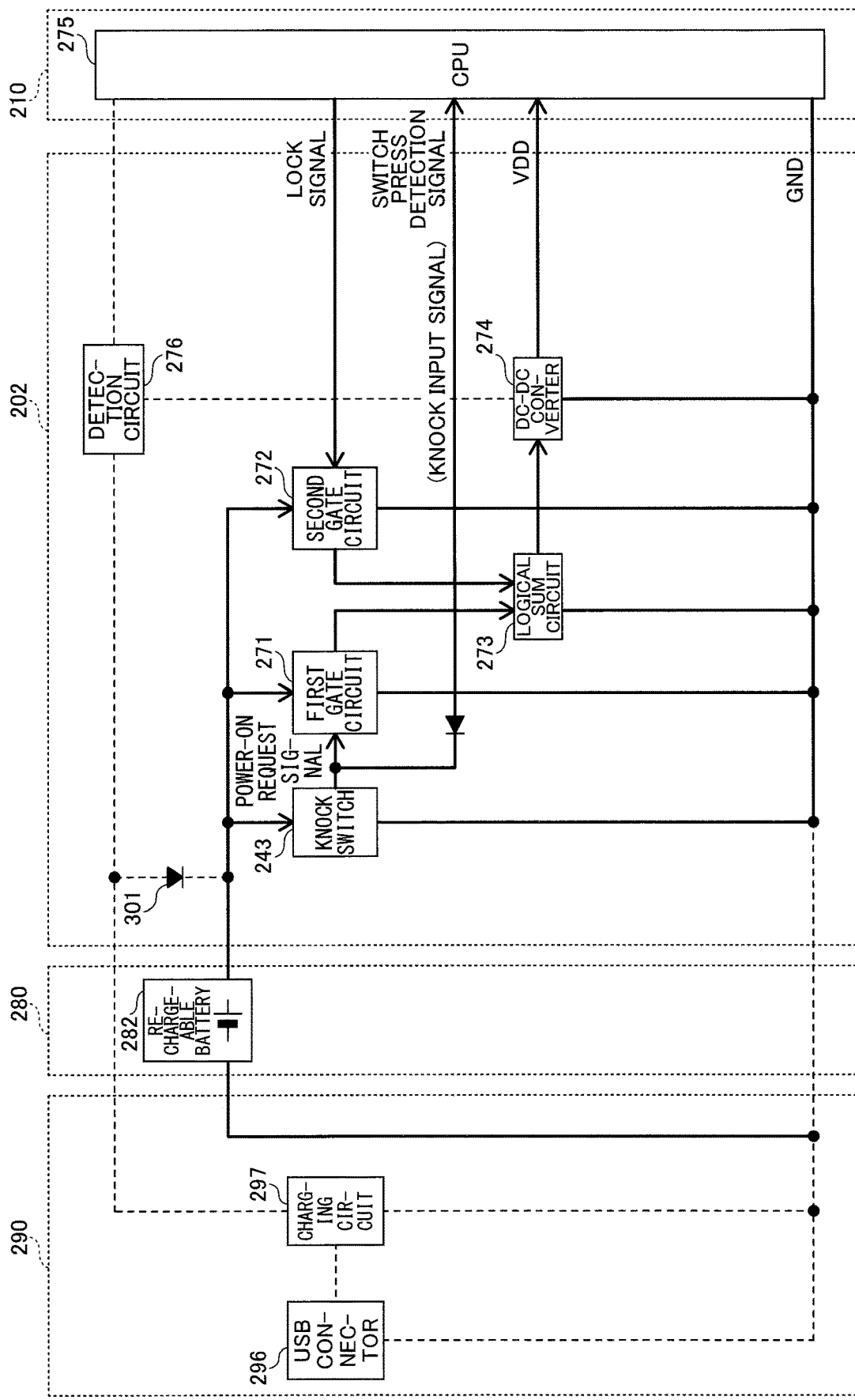
FIG. 17 is a diagram for explaining the electrical circuit of the first embodiment.

A process of turning on the power of the printer 200 will be described, by referring to FIG. 16 and FIG. 17. FIG. 16 is a flow chart for explaining the operation to turn on the power of the printer 200. FIG. 17 is a diagram for explaining the electrical circuit of the printer 200 in the state in which the printer 200 is driven by the battery 282. In FIG. 17, a solid line indicates a route in which the current or the signal flows, and a dotted line indicates a route in which the current or the signal does not flow.

When the knock switch 243 is pressed in S102, the process advances to S104. On the other hand, if the knock switch 243 is not pressed, S102 is repeated. The voltage from the battery 282 is applied to the knock switch 243, even in a state in which the printer 200 is turned off.

When the knock switch 243 is pressed, the power-on request signal is output from the knock switch 243 to the first gate circuit 271, during a time in which the knock switch 243 is pressed. When the power-on request signal is input to the first gate circuit 271, the first gate circuit 271 outputs the high-level signal to the or circuit 273 in S104. Then, the high-level signal is output from the OR circuit 273 in S106.

Next, in S108, the signal from the OR circuit 273 is input to the DC-DC converter 274, to activate the DC-DC converter 274. Hence, the DC-DC converter 274 supplies the logic voltage VDD to the printing unit 210.

The low-level switch press detection signal (a sink signal with respect to the CPU 275) is output to the CPU 275 while the knock switch 243 is pressed. The CPU 275 enters a stable activated state based on the low-level switch detection signal when the knock switch 243 is pressed longer than or equal to the predetermined time from S102. On the other hand, when the elapsed pressing time is shorter than the predetermined time, the CPU 275 is not activated and is turned off when the knock switch 243 is released from the pressed state. Whether the pressing time is longer than or equal to the predetermined time is judged in S110. The process advances to S112 when the pressing time of the knock switch 243 is longer than or equal to the predetermined time, and the process advances to S114 when the pressing time is shorter than the predetermined time. The CPU 275 starts operation in S112, and the process advances to S116. On the other hand, the DC-DC converter 274 is deactivated and stopped in S114 to turn off the power of the printer 200, and the process ends.

After the CPU 275 is activated in S112, the CPU 275 determines in S116 whether a knock input signal from the knock switch 243 is correctly input to the CPU 275. The knock input signal is output from the knock switch 243 while the knock switch 243 is pressed. The correct input of the knock input signal to the CPU 275 can be judged by detecting whether the knock switch 243 is released after being pressed for a predetermined time. When the knock switch 243 is pressed to turn on the power, an operator is expected to stop pressing the knock switch 243 at an appropriate timing. On the other hand, if the knock input signal is not canceled for a time exceeding the predetermined time, it can be judged that the input of the knock input signal is caused by an abnormality such as the knock switch 243 being pressed by an object other than the operator. When it is judged that the knock input signal is correctly input to the CPU 275, the process advances to S118. On the other hand, when it is judged that the knock input signal is incorrectly input to the CPU 275, the process advances to S114.

By detecting the long press of the knock switch 243 by the CPU 275 in S110, and the correct input of the knock input signal in S116, it is possible to confirm the intention of the operator operating the printer 200 to turn on the power. For this reason, it is possible to prevent the power of the printer 200 from being erroneously turned on.

When the power-on request signal is accepted, the CPU 275 outputs to the second gate circuit 272 the high-level lock signal in S118 for holding the output of the DC-DC converter 274.

Next, in S120, the operation of the DC-DC converter 274 is locked. When the high-level lock signal from the CPU 275 is input to the second gate circuit 272, the output level of the signal from the second gate circuit 272 becomes high, and is input to the OR circuit 273. Because the lock signal continues to be output from the CPU 275 even when the knock switch 243 is turned off, the output signal of the OR circuit 273 is maintained to the high level even when the operator releases the operator's finger from the knock switch 243. As a result, the high-level signal output from the OR circuit 273 is continuously output to the DC-DC converter 274 to lock the operation of the DC-DC converter 274. Consequently, the power supply to the printing unit 210, the first photosensor 241, and the second photosensor 242 is continued.

Next, in S122, the indicator 277 is caused to blink a plurality of times. By blinking the indicator 277, it is possible to notify the operator that the power of the printer 200 is turned on.

By the operation described above, it is possible to turn on the power of the printer 200, and drive the printer 200 by the battery 282.

In this embodiment, the diode 301 is provided between the battery 282 and the charging circuit 297. The anode of the diode 301 is connected to the charging circuit 297, and the cathode of the diode 301 is connected to the battery 282. Accordingly, the current flows from the charging circuit 297 to the battery 282, however, no current flows from the battery 282 to the charging circuit 297. For this reason, as illustrated in FIG. 17, no current flows from the battery 282 to the charging circuit 297 in the state in which the printer 200 is driven by the battery 282.

Figure 18:
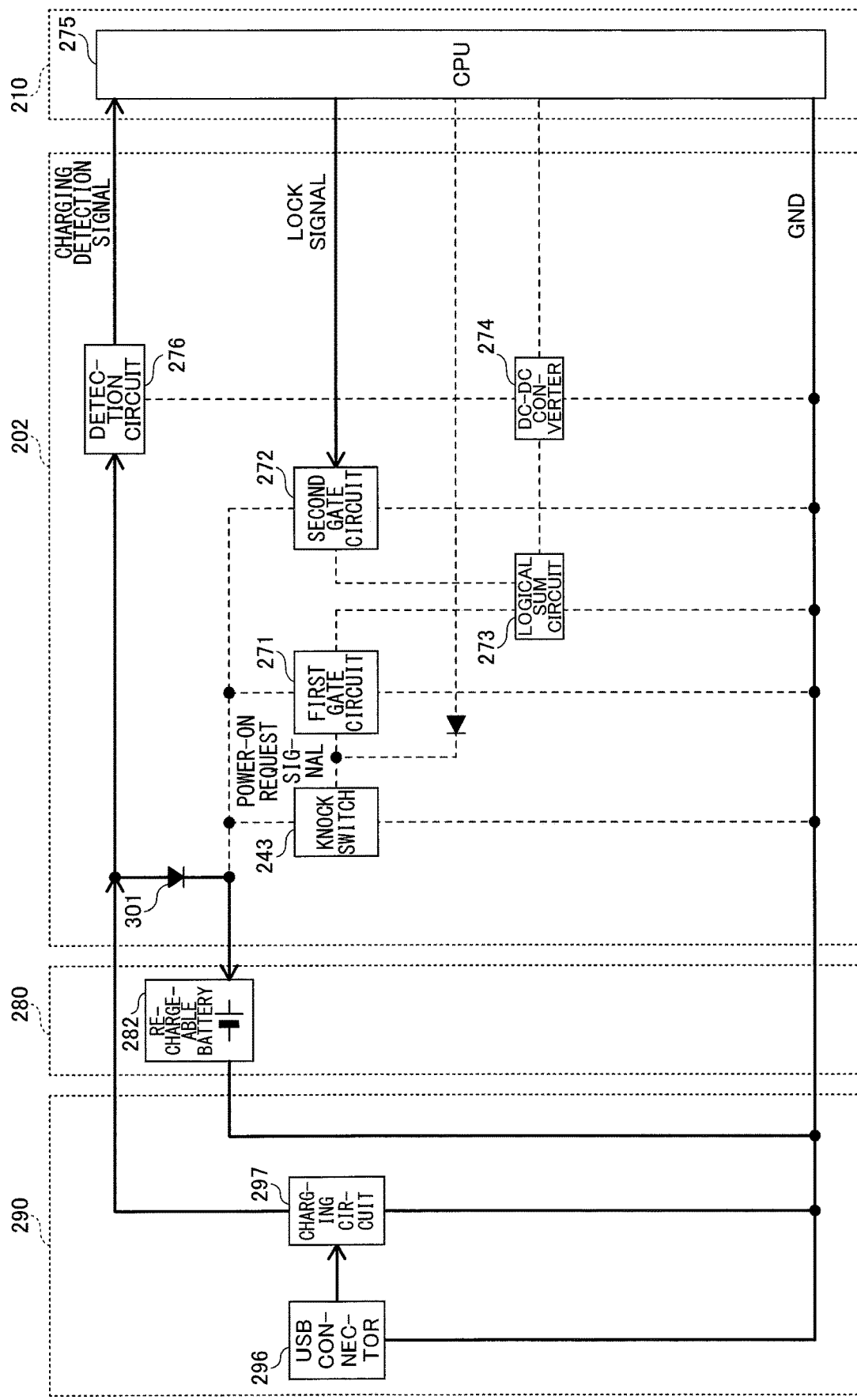
FIG. 18 is a diagram for explaining the electrical circuit of the first embodiment.

Next, the charging of the battery 282 will be described by referring to FIG. 18. When charging the battery 282, USB terminals of the battery charger (not illustrated) are connected to the USB connector 296. The battery charger converts AC voltage from a commercial power supply into a predetermined DC voltage.

When the USB terminals of the battery charger are connected to the USB connector 296, the charging circuit 297 is activated by the power supplied from the battery charger, and the charging circuit 297 supplies the power to the battery 282 via the diode 301 to start charging the battery 282. The output of the charging circuit 297 is also input to the detector 276. The charging detection signal output from the detector 276 is input to the CPU 275. The CPU 275 can detect and recognize that the battery 282 is being charged, according to the charging detection signal.

The charging detection signal is used to turn off the power after the current process in which the printer 200 is currently operating ends. The charging detection signal is also used to quickly turn off the power when the printer 200 is not operating. If other functions are performed during the charging of the battery 282, the charging current is consumed, and the actual charging current may greatly vary depending on an operation mode of the printer 200. However, the charging circuit 297 can only detect a sum of currents consumed by the charging of the battery 282 and other operations, and the charging may become incomplete. The power off operations with the charging detection signal can avoid a case that the battery 282 is practically not charged, although the operator recognizes that the battery 282 is charged.

During operation of the printer 200, the CPU 275 can detect from the charging detection signal when the battery charger is connected to the USB connector 296. After the current process ends, the CPU 275 turns off the DC-DC converter 274, and the charging current in its entirety can be used for the charging of the battery 282, to avoid the fault described above.

When the power of the printer 200 is turned on during charging the battery 282, the CPU 275 outputs the low-level lock signal as a lock release signal to the second gate circuit 272, to turn off the power after the current process ends. When the low-level lock signal is input to the second gate circuit 272, the low-level signal is output from the second gate circuit 272. If the knock switch 243 is not pressed, the first gate circuit 271 also outputs the low-level signal, and thus, the OR circuit 273 receiving the low-level signal from both the first gate circuit 271 and the second gate circuit 272 outputs the low-level signal. The low-level signal from the OR circuit 273 is input to the DC-DC converter 274, to deactivate the DC-DC converter 274, and the power of the printer 200 is turned off.

The printer 200 has a simple circuit configuration, and includes a relatively small number of components. Because no semiconductor switches are required, unwanted impedance components do not mix into the signals.

Even if the battery charger is erroneously connected to the printer 200 during operation of the printer 200, the detector 276 can detect the connection of the battery charger and notify the CPU 275 of the charging state. Hence, the printer 200 can perform an interactive process such as outputting an alarm in response to the notified charging state, after the current process that is being performed ends.

When the battery charger is to be used for purposes other than charging, an application program may be started, confirming whether the power is supplied or not, and executing the application program after the power supply is locked. The CPU 275 may receive a power cutoff request from the application program after the operation of the application program ends to cutoff the power supply. The use of the battery charger for the purposes other than the charging may include using the battery charger for supplying power to the printer 200 during a normal operation, for example.

Depending on the process that is being performed, processes requesting time associated with maintenance, downloading registered information, or sending the registered information to a host may occur simultaneously. In such a case, a judgment is made to determine whether the process such as registration is to have priority over charging, whether the process is to be interrupted, or the like. When interrupting the process halfway, the information indicating the interruption needs to be notified to the host. Hence, a process such as returning an alarm according to the interrupted process is required. Basically, a print process is interrupted after the printing is completed, and a non-print process is interrupted according to contents of the non-print process.

If the BLE communication is performed for a long period of time, the life of the battery 282 may become a problem when the battery drive is employed, and thus, it is necessary to employ an AC adapter drive. If a portable printer functions as a sensor or the like in which the application program requires the AC adapter drive, the operation mode is fixed to the AC adapter mode when locking the power supply by the application program, or when performing high-speed printing using a high-voltage AC adapter. The power is supplied to elements of the printing unit such as the head and the motor, and the supplied voltage may be detected by a voltage detector provided in the printing unit 210.

Second Embodiment

The printer in a second embodiment will be described.

Functional blocks of the printer will be described by referring to FIG. 19. The battery 282 is provided inside the power supply 280. The USB connector 296, the charging circuit 297, the indicator 277, a setting circuit 310, a switch 320, and a first switch 331 are provided in the charger 290. In addition, the driver (not illustrated) that drives the printer 200, and the CPU 275 are provided in the printing unit 210.

The setting circuit 310 opens the first switch 331 when the charging circuit 297 outputs the charging voltage. The first switch 331 is opened by a hardware approach in the case of a long-term storage state. The setting circuit 310 receives a feedback voltage from the battery 282 and an output signal of the charging circuit 297. A feedback voltage is input from the setting circuit 310 to an anode terminal of a LED (Light Emitting Diode) of the first switch 331 via a limiting resistor. The output signal of the setting circuit 310 is input to a gate of a switching element such as a MOS (Metal Oxide Semiconductor) transistor, and an output terminal of the switching element is connected to a node connecting the limiting resistor and an input terminal of the first switch 331, to set an input voltage of the first switch 331 to levels according to an output voltage of the setting circuit 310.

The knock dial 202 includes the first photosensor 241, the second photosensor 242, the knock switch 243, the first gate circuit 271, the second gate circuit 272, the OR circuit 273, the DC-DC converter 274, a diode 302, and a second switch 332.

The first switch 331 and the second switch 332 respectively are formed by a photo-MOS switch that includes the LED, a photoelectric element, and a MOSFET (Metal Oxide Semiconductor Field Effect Transistor), and is switched on and off according to light emitted from the LED and received by the photoelectric element. The LED emits the light when a forward current flows to the LED. The first switch 331 and the second switch 332 are normally open. A resistor 333 is a bias resistance with respect to the LED of the second switch 332.

The first switch 331 is turned on or off according to a level of the signal output from the setting circuit 310. For the sake of convenience, terminals of the first switch 331 in FIG. 19 are labeled as follows. A terminal on the side of the setting circuit 310 is labeled as a terminal T1, a terminal on the side of the switch 320 is labeled as a terminal T2, an upper-side terminal is labeled as a terminal T3, and a lower-side terminal is labeled as a terminal T4. The LED is arranged between the terminals T1 and T2 with the anode terminal connected to the terminal T1. By applying the voltage to the terminal T1 from the setting circuit 310, the LED in the first switch 331 emits light, and the photo-MOS switch in the first switch 331 turns on, so that the terminals T3 and T4 become conducting.

When the switch 320 is turned off, no current flows to the LED in the first switch 331, and this LED turns off. Hence, the photo-MOS in the first switch 331 turns off, so that the terminals T3 and T4 become non-conducting.

Figure 19:
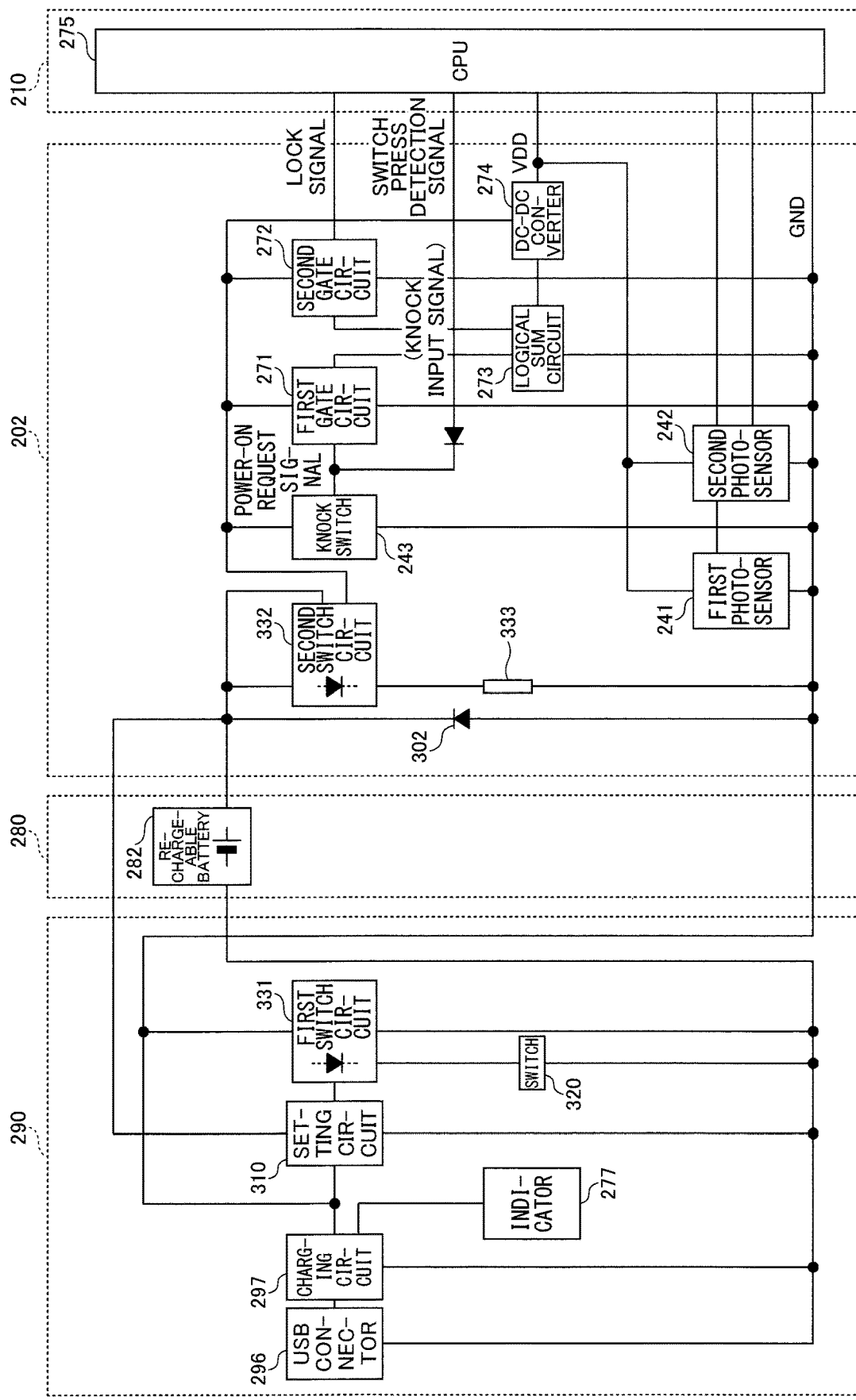
FIG. 19 is a block diagram illustrating the electrical circuit of a second embodiment.

For the sake of convenience, terminals of the second switch 332 in FIG. 19 are labeled as follows. A left upper-side terminal of the second switch 332 is labeled as a terminal T5, a left lower-side terminal is labeled as a terminal T6, a right upper-side terminal is labeled as a terminal T7, and a right lower-side terminal is labeled as a terminal T8. The LED is arranged between the terminals T5 and T6 with anode terminal connected to the terminal T5, similar to the first switch 331.

By applying the voltage to the terminal T5, the LED in the second switch 332 emits light, and the photo-MOS switch in the second switch 332 turns on, so that the T7 and T8 become conducting.

When the voltage applied to the terminal T5 is stopped, no current flows to the LED in the second switch 332 and the LED turns off. Hence, the photo-MOS in the second switch 332 turns off, so that the terminals T7 and T8 become non-conducting.

Figure 20:
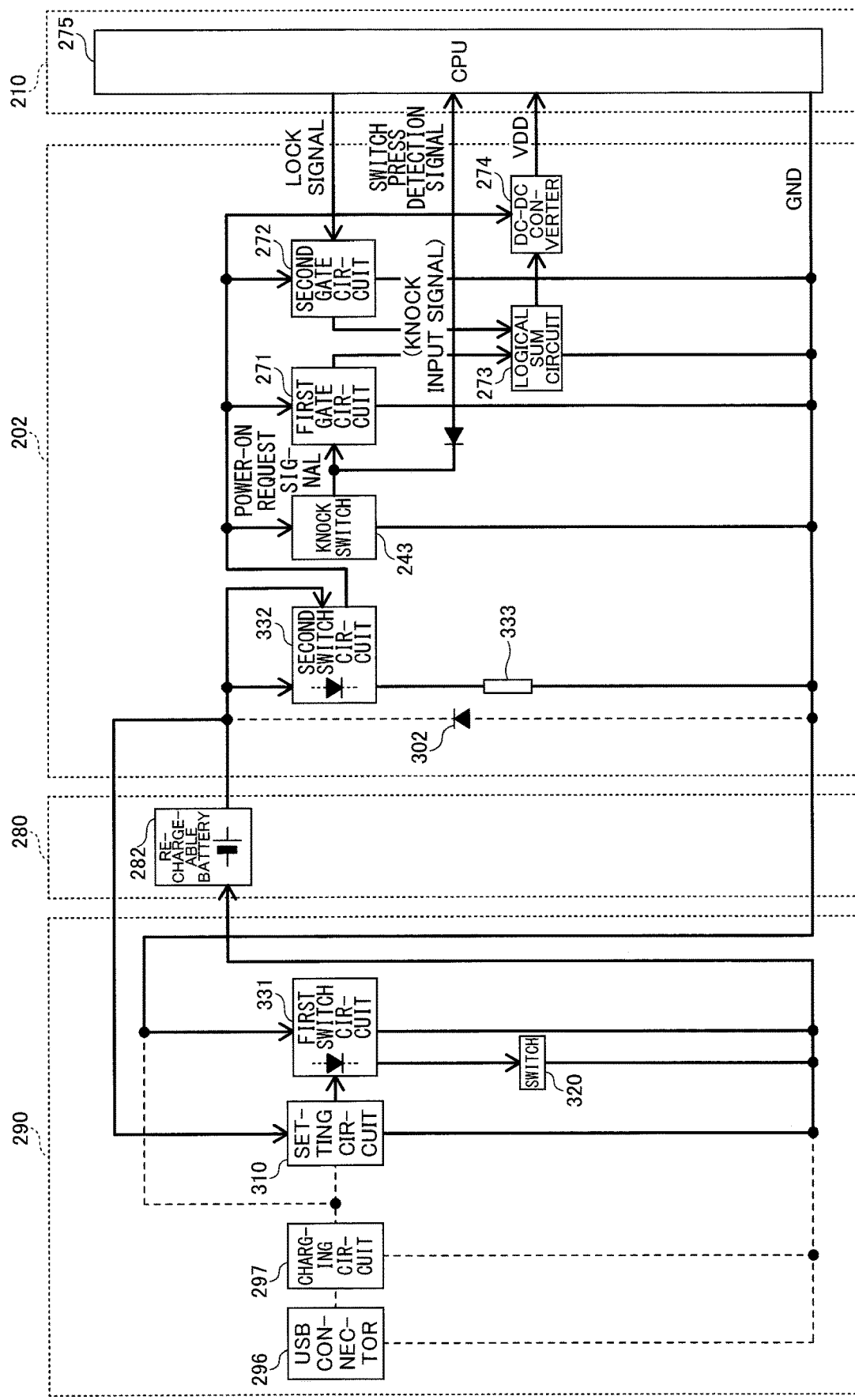
FIG. 20 is a diagram for explaining the electrical circuit of the second embodiment.

The printer driven by the battery 282 will be described, by referring to FIG. 20. When the printer is driven by the battery 282, the power from the battery 282 is supplied to the knock dial 202 and the printing unit 210, and is also supplied to the charger 290. In FIG. 20, the power from the battery 282 is supplied to the setting circuit 310, and the switch 320 is closed. The setting circuit 310 supplied with the power from the battery 282 outputs to the first switch 331 a signal that turns on the first switch 331. Because the switch 320 is closed and a circuit is formed, the signal output from the setting circuit 310 causes a current to flow through a route from the setting circuit 310 to the switch 320 through the LED in the first switch 331. As a result, the LED in the first switch 331 emits light, and the first switch 331 is turned on.

The second switch 332 is connected in parallel to the diode 302. In FIG. 20, a forward voltage is applied from the battery 282 to the second switch 332. Because the first switch 331 is on, a current flows to the LED in the second switch, and the second switch 332 is turned on to supply power to the printing unit 210. On the other hand, the current from the battery 282 does not flow through the diode 302 because the reverse voltage is applied to the diode 302.

The forward voltage is applied to the diode 302 at the time of charging the battery 282, and the battery 282 is charged through the diode 302. In this state, a power supply circuit including the knock switch 243 and elements in subsequent stages are reverse biased. The second switch 332 is provided for the purpose of cutting off this circuit.

Figure 21:
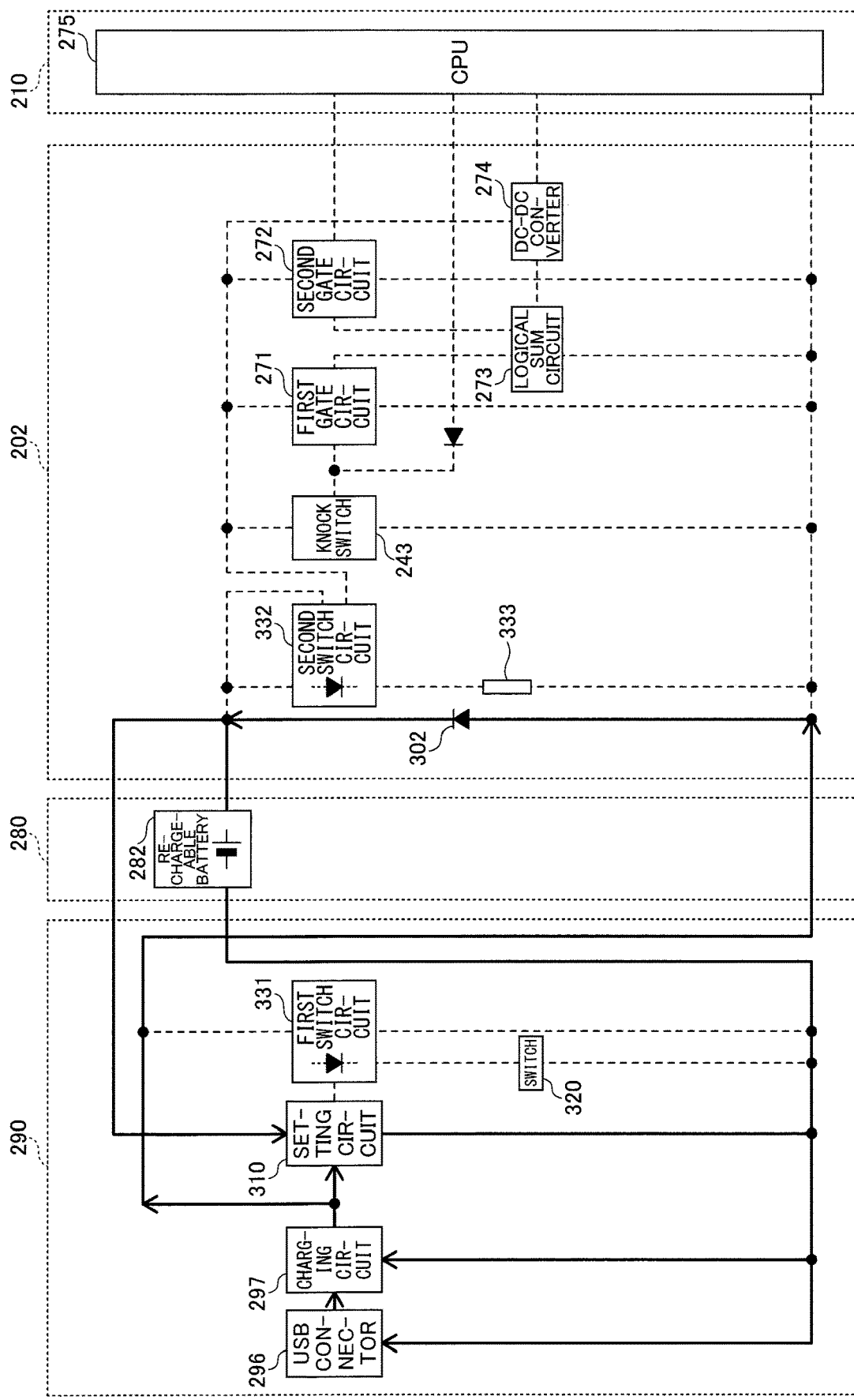
FIG. 21 is a diagram for explaining the electrical circuit of the second embodiment.

Next, the charging of the battery 282 will be described, by referring to FIG. 21. When charging the battery 282, the USB terminals of the battery charger (not illustrated) are connected to the USB connector 296.

When the USB terminals of the battery charger are connected to the USB connector 296, the charging circuit 297 is activated by the power from the battery charger. In this case, because the forward voltage is applied to the diode 302, power is supplied from the charging circuit 297 to the battery 282 via the diode 302 to start charging the battery 282.

The power from the battery 282 is supplied to the setting circuit 310, however, the output of the charging circuit 297 is also input to the setting circuit 310. In the state in which the output of the charging circuit 297 is input to the setting circuit 310, the setting circuit 310 control the first switch 331 to turn off to prevent short-circuiting of the output signal of the charging circuit 297.

When charging the battery 282, the reverse voltage is applied to the second switch 332, and the first switch 331 is off. Hence, the LED in the second switch 332 does not emit light, and no power is supplied to the knock dial 202 and the printing unit 210 as the second switch 332 remains open.

Figure 22:
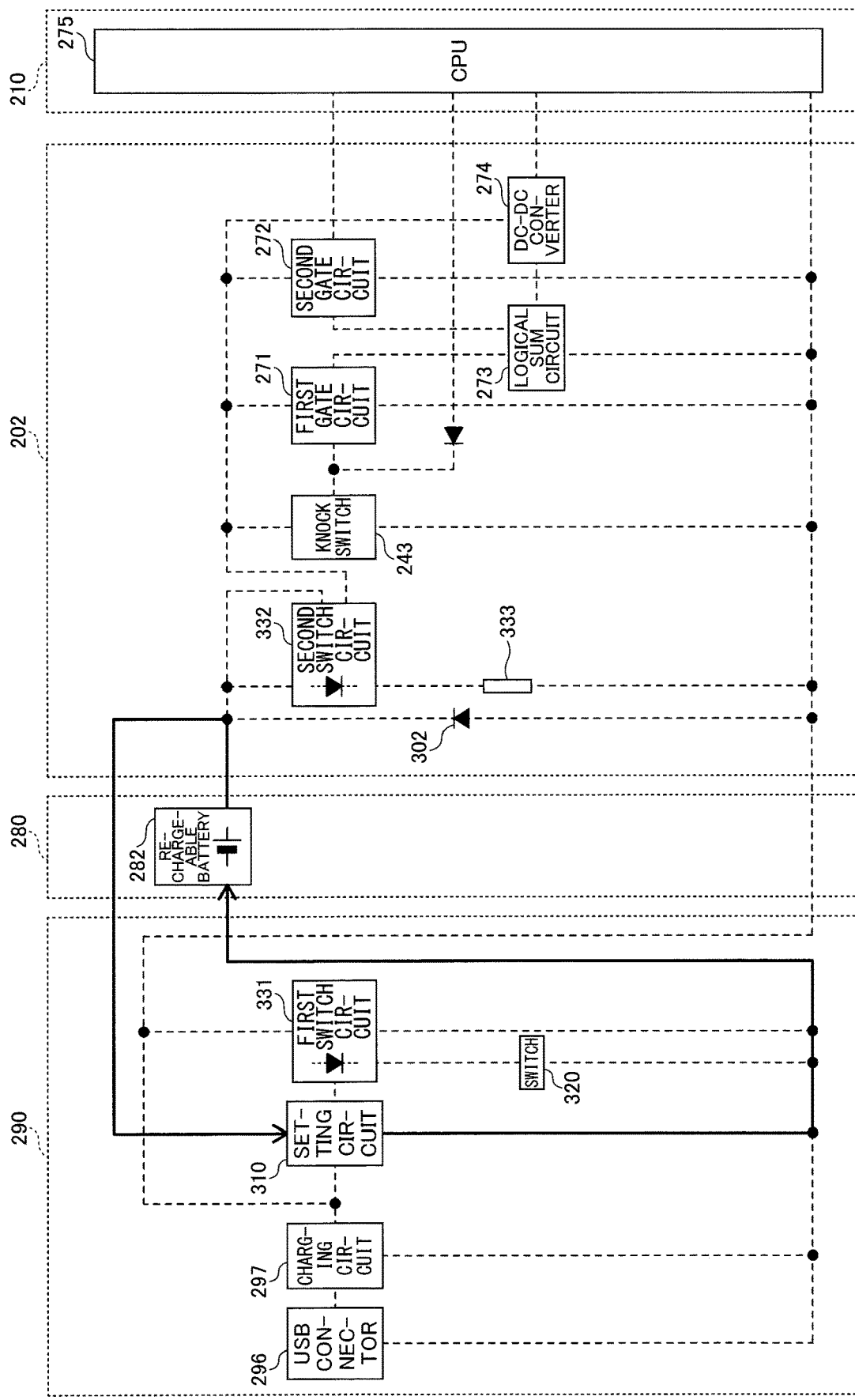
FIG. 22 is a diagram for explaining the electrical circuit of the second embodiment.

When the printer is not used for a long period of time, the switch 320 is turned off as illustrated in FIG. 22. In this case, no current flows to the LED in the first switch 331, and the first switch 331 remains in an open state. In addition, no current flow to the LED in the second switch 332, and the second switch 332 is turned off. Hence, no power is supplied to the printing unit 210, and the power charged in the battery 282 can be stored for a long period of time to enable long-term storage.

This embodiment includes, among other things, the following features.

The printer is configured to switch between the driving by the battery 282 and the charging of the battery 282, by turning the first switch 331 on and off by hardware, without using the CPU 275 nor the detector 276. By the setting of the switch 320, a power consumption of the battery 282 can be reduced when the printer is not used for a long period of time. In this case, both the first switch 331 and the second switch 332 will not turn on, and the power is not turned on even when the knock switch 243 is pressed, because the power supply circuit and the elements in the subsequent stages are cut off by hardware. When charging the battery 282, the terminals T3 and T4 of the first switch 331 become non-conducting when the signal output from the setting circuit 310 turns off, and the current flows through the route described above in conjunction with FIG. 21.

In the case in which the battery 282 drives the printer, the output of the battery 282 is fed back when the second switch 332 turns on, and the first switch 331 turns on to form the circuit described above, and the terminals T7 and T8 of the second switch 332 become conducting.

When the signal output from the setting circuit 310 turns on, the first switch 331 turns on, and the terminals T3 and T4 of the first switch 331 become conducting, and the current flows through the route described above in conjunction with FIG. 19.

Further, when the printer is not used for a long period of time, the switch 320 turns off, the first switch 331 turns off, and the second switch 332 turns off because no current flows to the second switch 332. Hence, the current flows through the route described above in conjunction with FIG. 22.

Other features of this embodiment are similar to the corresponding features of the first embodiment described above.

Third Embodiment

The printer in a third embodiment will be described.

Figure 23:
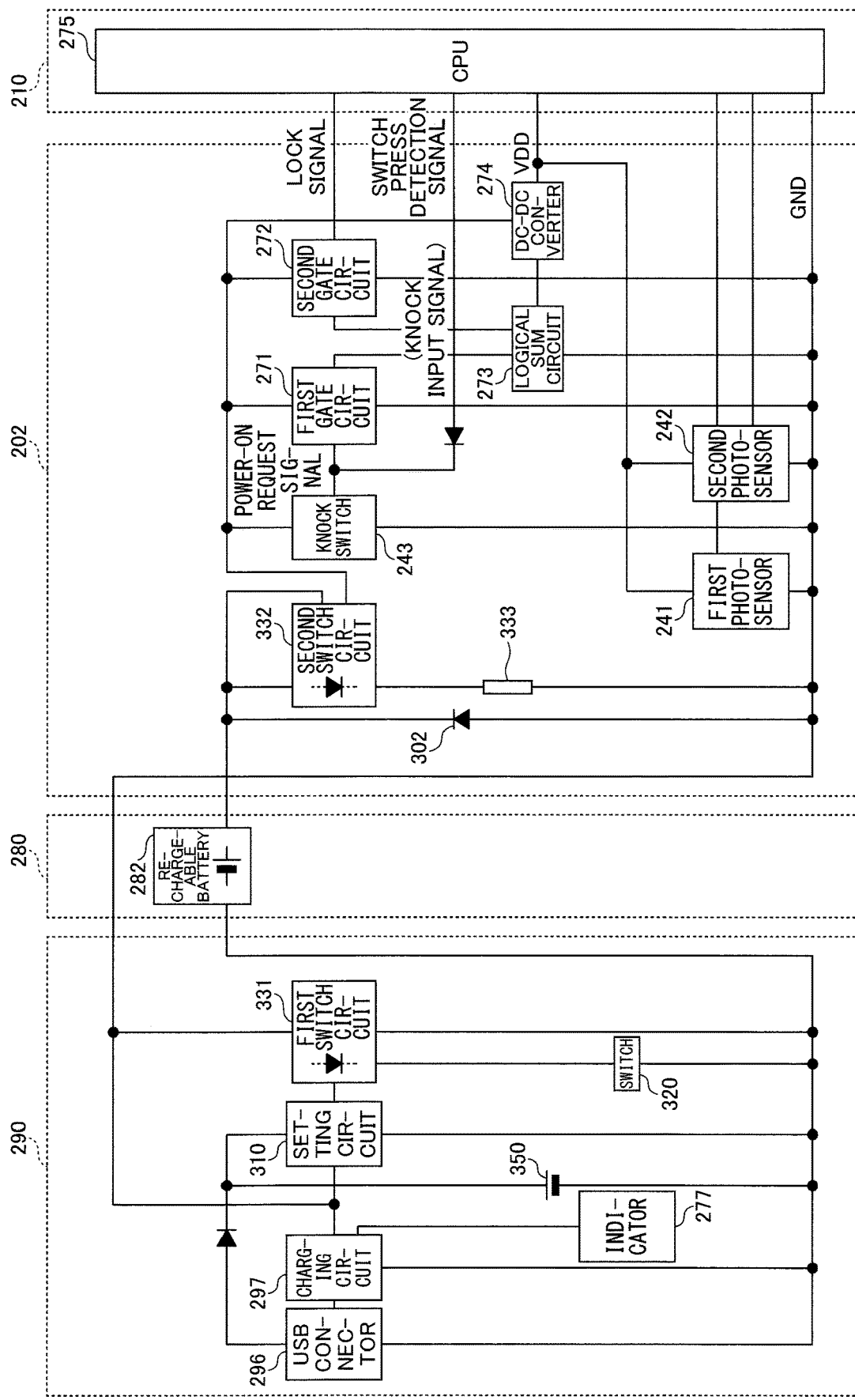
FIG. 23 is a block diagram illustrating the electrical circuit of the third embodiment.

Functional blocks of the printer will be described by referring to FIG. 23. The battery 282 is provided inside the power supply 280. The USB connector 296, the charging circuit 297, the indicator 277, the setting circuit 310, the switch 320, the first switch 331, and a rechargeable battery 350 are provided in the charger 290.

The driver (not illustrated) that drives the entire printer 200, and the CPU 275 are provided in the printer function part 210.

The knock dial 202 includes the first photosensor 241, the second photosensor 242, the knock switch 243, the first gate circuit 271, the second gate circuit 272, the OR circuit 273, the DC-DC converter 274, the diode 302, and the second switch 332.

Figure 24:
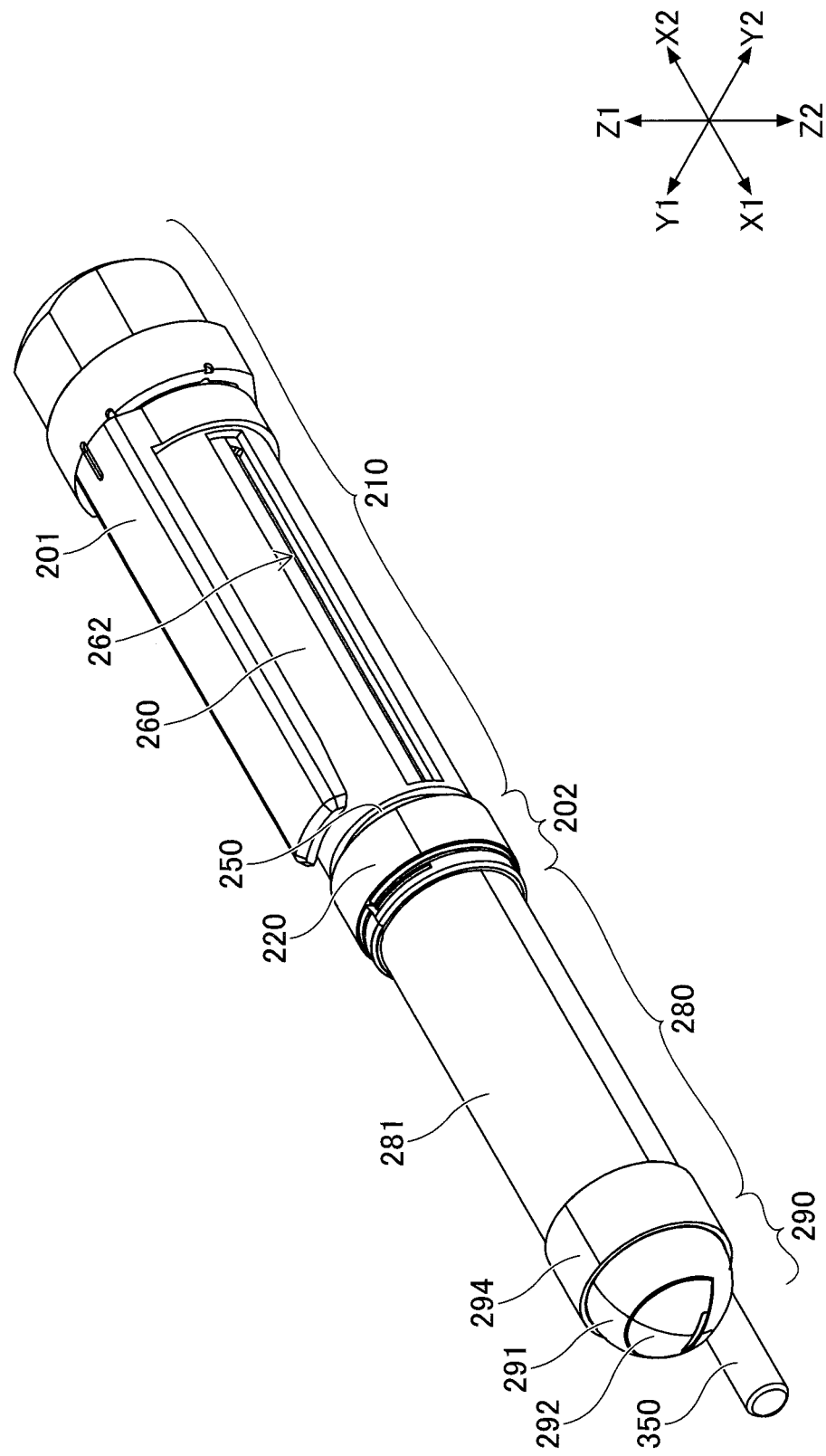
FIG. 24 is a perspective view of the printer in the third embodiment.

In this embodiment, power from the battery 350 is supplied to the setting circuit 310. The battery 350 may be provided at the end of the charger 290, as illustrated in FIG. 24. For example, a pin-type ultra-small lithium ion battery may be used as the battery 350.

Figure 25:
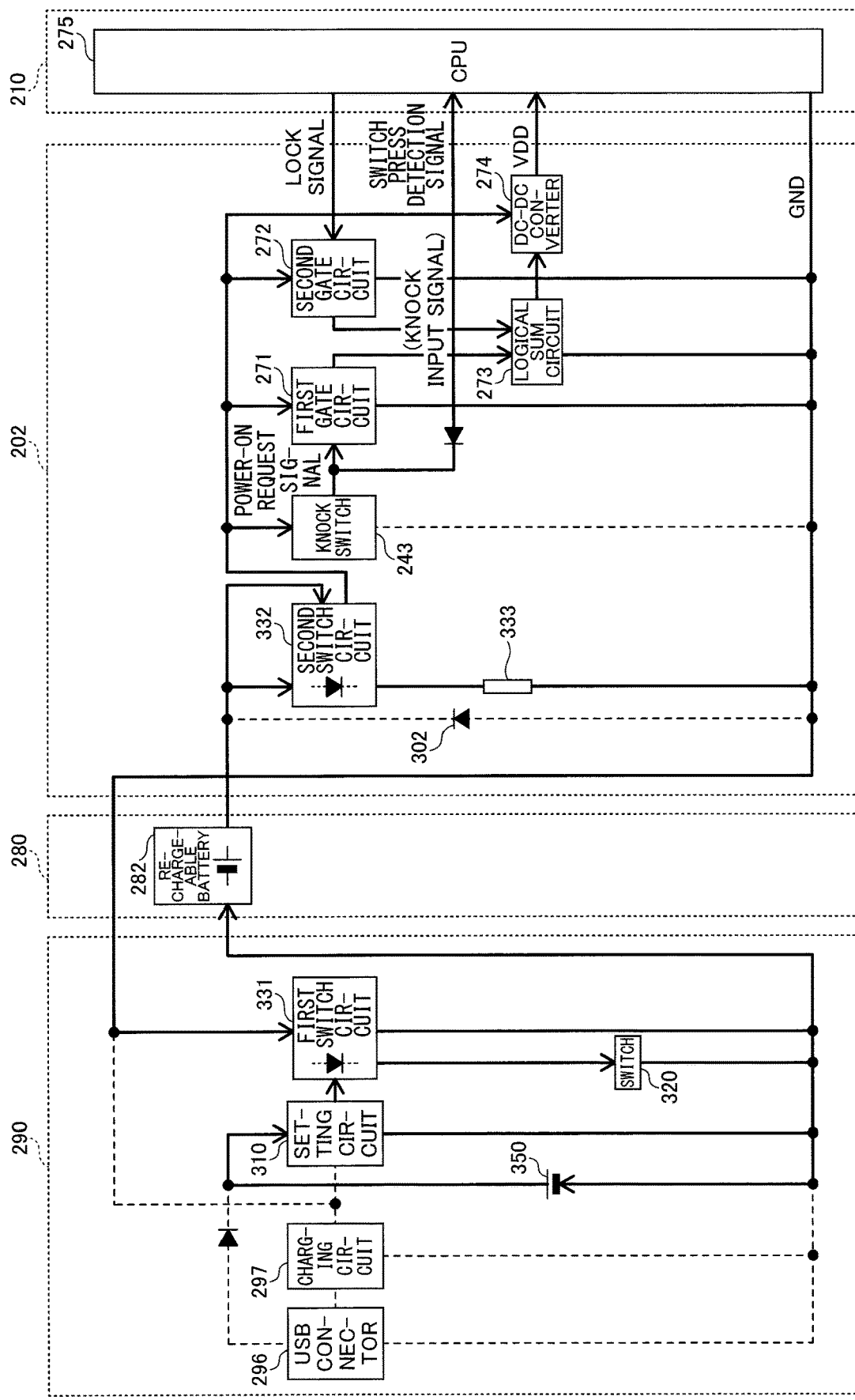
FIG. 25 is a diagram for explaining the electrical circuit of third embodiment.

When the printer is driven by the battery 282 as illustrated in FIG. 25, the switch 320 is closed, and the first switch 331 is closed by the control of the setting circuit 310. In addition, because the power from the battery 282 is supplied to the second switch 332, the LED in the second switch 332 emits light, and the second switch 332 is closed. For this reason, the power from the battery 282 is supplied to the knock dial 202 and the printing unit 210.

In other words, a voltage from the battery 350 is applied to the setting circuit 310, and a high-level signal is applied to the anode of the LED of the first switch 331. However, as the switch 320 is closed, a forward current flows to turn on and short-circuit the MOS transistor provided on the output side of the first switch 331, and the first switch 331 is closed.

Next, the charging of the battery 282 will be described by referring to FIG. 26. When charging the battery 282, the USB terminals of the battery charger (not illustrated) are connected to the USB connector 296.

When the USB terminals of the battery charger are connected to the USB connector 296, the charging circuit 297 is activated by the power from the battery charger. In this case, power is supplied from the charging circuit 297 to the battery 282 via the diode 302 to start charging the battery 282. The setting circuit 310 that receives the output of the charging circuit 297 controls the first switch 331 to turn off.

Figure 26:
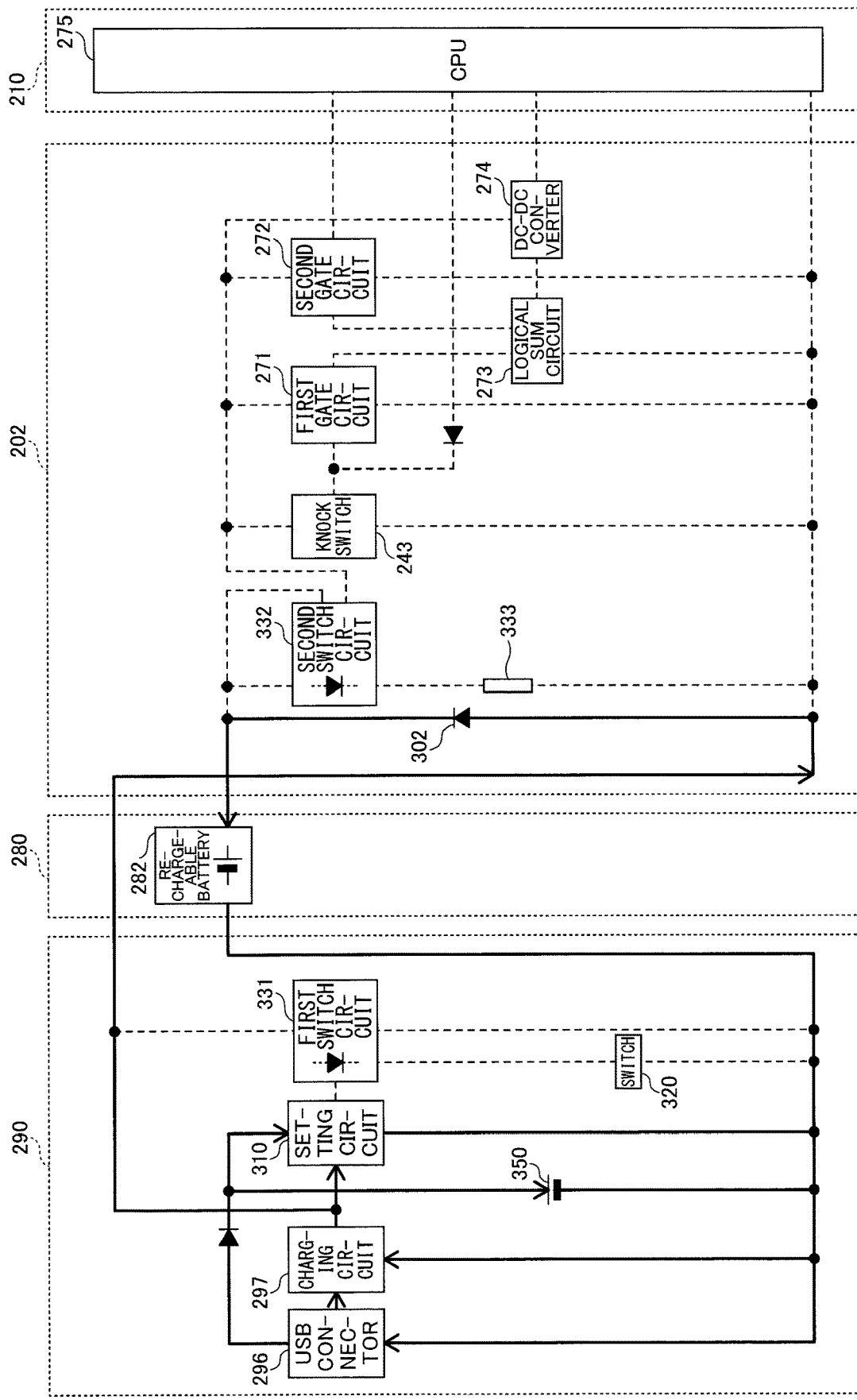
FIG. 26 is a diagram for explaining the electrical circuit of the third embodiment.

When charging the battery 282 as illustrated in FIG. 26, the current flows in the reverse direction compared to the case in which the battery 282 drives the printer as illustrated in FIG. 25. The LED in the second switch 332 is reverse-biased and the second switch 332 turns off, so that no power is supplied to the knock dial 202 and the printing unit 210.

Figure 27:
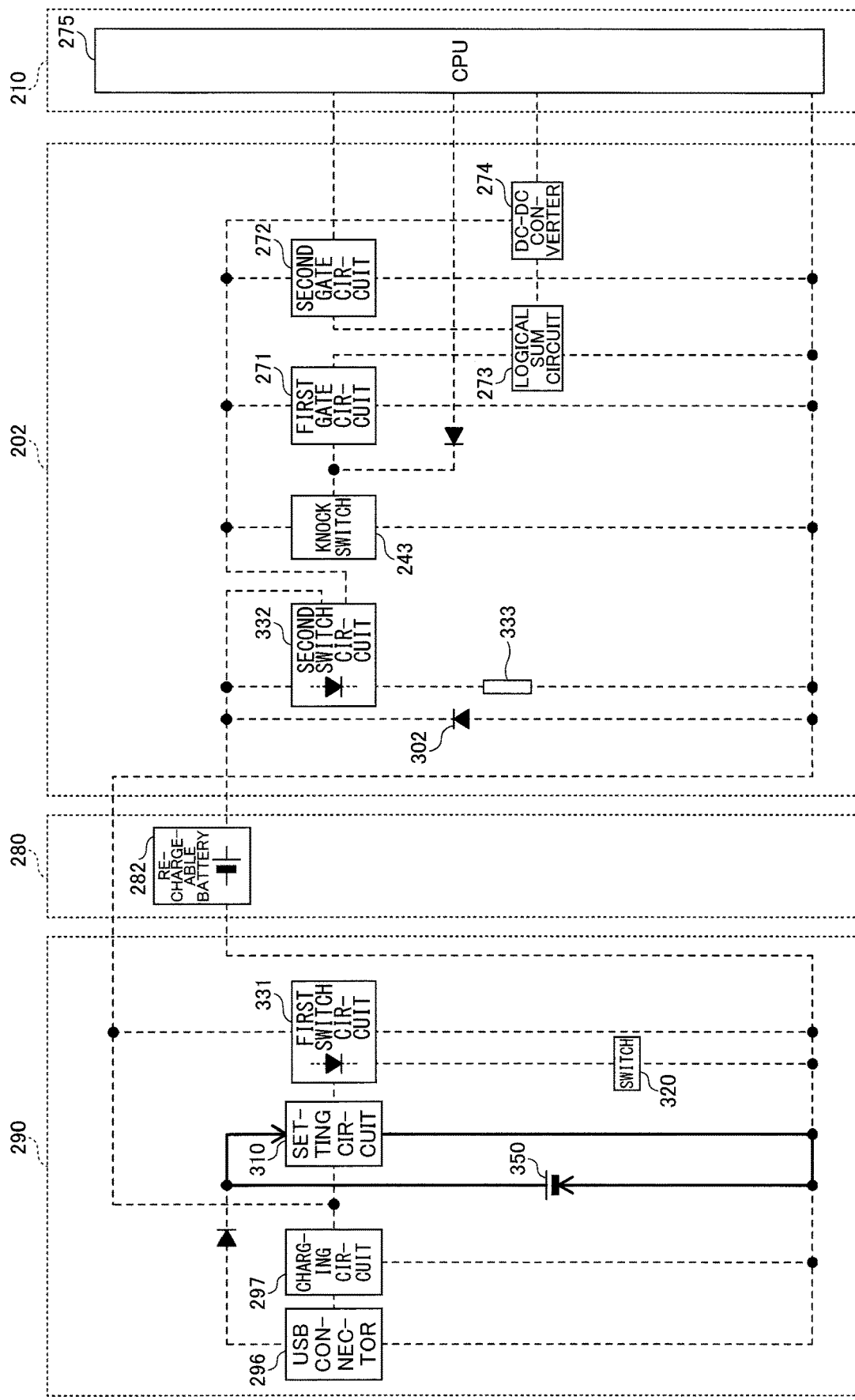
FIG. 27 is a diagram for explaining the electrical circuit of third embodiment.

If the printer is not used for a long period of time, the switch 320 is turned off as illustrated in FIG. 27. In this case, the first switch 331 does not turn on, and the second switch 332 also does not turn on because no current flows through the first switch 331. Consequently, no power is supplied to the printing unit 210, and the power of the battery 282 is not consumed.

This embodiment includes, among other things, the following features.

The wiring 285 becomes unnecessary by supplying the power to the setting circuit 310 from the battery 350. The printer is configured to switch between the driving by the battery 282 and the charging of the battery 282 by hardware by turning the first switch 331 on and off, without using the CPU 275 nor the detector 276. By the setting of the switch 320, the power consumption of the battery 282 can be reduced when the printer is not used. In this case, the power is not turned on even when the knock switch 243 is pressed.

According to the embodiments described above, it is possible to provide a printer that can be carried and charged with ease.

Although the embodiments are numbered with "first," "second," "third," etc., the ordinal numbers do not imply priorities of the embodiments.

Further, the present invention is not limited to these embodiments, but various variations and modifications may be made without departing from the scope of the present invention.

What is claimed is:

1. A printing apparatus comprising:
a printer function part configured to print received information on a recording sheet;
a power supply including a rechargeable battery;
a charger, coupled to the power supply, and configured to charge the rechargeable battery; and
an input part, coupled to the printer function part, and configured to input information to the printer function part when operated by an operator,
wherein the printing apparatus has a columnar shape having a first end, and a second end opposite to the first end, along a longitudinal direction thereof, and
wherein the printer function part, the input part, the power supply, and the charger are arranged from the first end towards the second end of the columnar shape, in an order of the printer function part, the input part, the power supply, and the charger.

2. The printing apparatus as claimed in claim 1, further comprising:
a detection circuit, coupled to the power supply, and configured to detect a charging state where the charger charges the rechargeable battery, and to output a detection signal upon detecting the charging state,
wherein the power supply includes a wiring that couples the charger to the rechargeable battery via a diode, and
wherein the printer function part is controlled based on the detection signal output from the detection circuit.

3. The printing apparatus as claimed in claim 1, wherein the printer function part includes a controller, and
the controller supplies no power from the rechargeable battery to the printer function part while the rechargeable battery is being charged by the charger.

4. The printing apparatus as claimed in claim 1, further comprising:
a first switch coupled to the charger; and
a second switch coupled to the rechargeable battery,
wherein the first switch and the second switch are closed to supply power from the rechargeable battery to the printer function part, and
wherein the first switch and the second switch are opened to charge the rechargeable battery and supply no power from the rechargeable battery to the printer function part.

5. The printing apparatus as claimed in claim 1, wherein the columnar shape of the printing apparatus is a cylindrical or pen shape.

6. The printing apparatus as claimed in claim 1, wherein the printer function part includes
an inner lid and an outer lid respectively having a cylindrical shape,
wherein the inner lid enters an inner side of the outer lid,
wherein the inner lid includes a first feed opening and a first ejection opening that open along a generatrix of the inner lid,
wherein the outer lid includes a second feed opening and a second ejection opening that open along a generatrix of the outer lid,
wherein the outer lid is rotatable with respect to the inner lid,
wherein the printer function part prints the received information on the recording sheet in a state where the first feed opening matches the position of the second feed opening, the first ejection opening matches the position of the second ejection opening, the recording sheet enters the printer function part through the first feed opening and the second feed opening that are open, and the recording sheet is ejected from the printer function part through the first ejection opening and the second ejection opening that are open.

7. The printing apparatus as claimed in claim 6, wherein the input part is a knock dial having a cylindrical shape.

8. The printing apparatus as claimed in claim 1, wherein the input part is a knock dial having a cylindrical shape.

9. A printing apparatus comprising:
a printer function part configured to print on a recording sheet;
a power supply including a rechargeable battery;
a charging circuit configured to charge the rechargeable battery;
a first switch coupled to the charging circuit;
a second switch coupled to the rechargeable battery; and
a diode coupled in parallel to the second switch,
wherein the first switch and the second switch are closed to supply power from the rechargeable battery to the printer function part,
wherein the first switch and the second switch are opened to charge the rechargeable battery and supply no power from the rechargeable battery to the printer function part,
wherein the diode and the second switch are coupled to the rechargeable battery, wherein a reverse voltage is applied to the diode and the second switch is closed while the power from the rechargeable battery is supplied to the printer function part, and wherein a forward current flows to the diode, the rechargeable battery is charged by the current flowing through the diode, and the second switch is opened, to supply no power from the rechargeable battery to the printer function part while the rechargeable battery is being charged.

* * * * *